(12) United States Patent
Bone et al.

(10) Patent No.: US 10,386,599 B2
(45) Date of Patent: Aug. 20, 2019

(54) OCULAR OPTICAL SYSTEM

(71) Applicant: GENIUS ELECTRONIC OPTICAL (XIAMEN) CO., LTD., Xiamen (CN)

(72) Inventors: Matthew Bone, Xiamen (CN); Maozong Lin, Xiamen (CN); Feng Li, Xiamen (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 0 days.

(21) Appl. No.: 15/868,924

(22) Filed: Jan. 11, 2018

(65) Prior Publication Data

US 2018/0196222 A1 Jul. 12, 2018

Related U.S. Application Data

(63) Continuation-in-part of application No. 15/415,696, filed on Jan. 25, 2017, now abandoned.

(30) Foreign Application Priority Data

Jan. 11, 2017 (CN) .......................... 2017 1 0020164
Dec. 5, 2017 (CN) .......................... 2017 1 1267559

(51) Int. Cl.
  *G02B 9/34* (2006.01)
  *H04N 13/332* (2018.01)
  *G02B 25/00* (2006.01)
(52) U.S. Cl.
  CPC ............. *G02B 9/34* (2013.01); *G02B 25/001* (2013.01); *H04N 13/332* (2018.05)

(58) Field of Classification Search
  CPC .... G02B 9/34; G02B 27/0172; G02B 25/001; G02B 2027/0134; H04N 13/332
  USPC ......................................... 359/642, 643, 644
  See application file for complete search history.

(56) References Cited

U.S. PATENT DOCUMENTS 9,541,734 B2  1/2017  Chen et al.
9,658,430 B2  5/2017  Chen et al.

FOREIGN PATENT DOCUMENTS

CN    106094169 A    11/2016
JP    2007-218947 A   8/2007
TW      I529420 B     4/2016

OTHER PUBLICATIONS

Office Action for Taiwanese Application No. 106143517 dated Sep. 12, 2018; 8 pages.

*Primary Examiner* — Tuyen Tra
(74) *Attorney, Agent, or Firm* — Huffman Law Group, PC

(57) ABSTRACT

Present embodiments provide for ocular optical systems. An ocular optical system for imaging of imaging rays entering an eye of an observer via the ocular optical system and a pupil of the eye of the observer from a display screen, may comprise four lens elements positioned sequentially from an eye side to a display side. By controlling the refracting power and the surface shape of the lens elements and designing parameters satisfying at least one inequality, the ocular optical system may exhibit better optical characteristics and the half apparent field of view of the ocular optical system may be broadened.

19 Claims, 38 Drawing Sheets

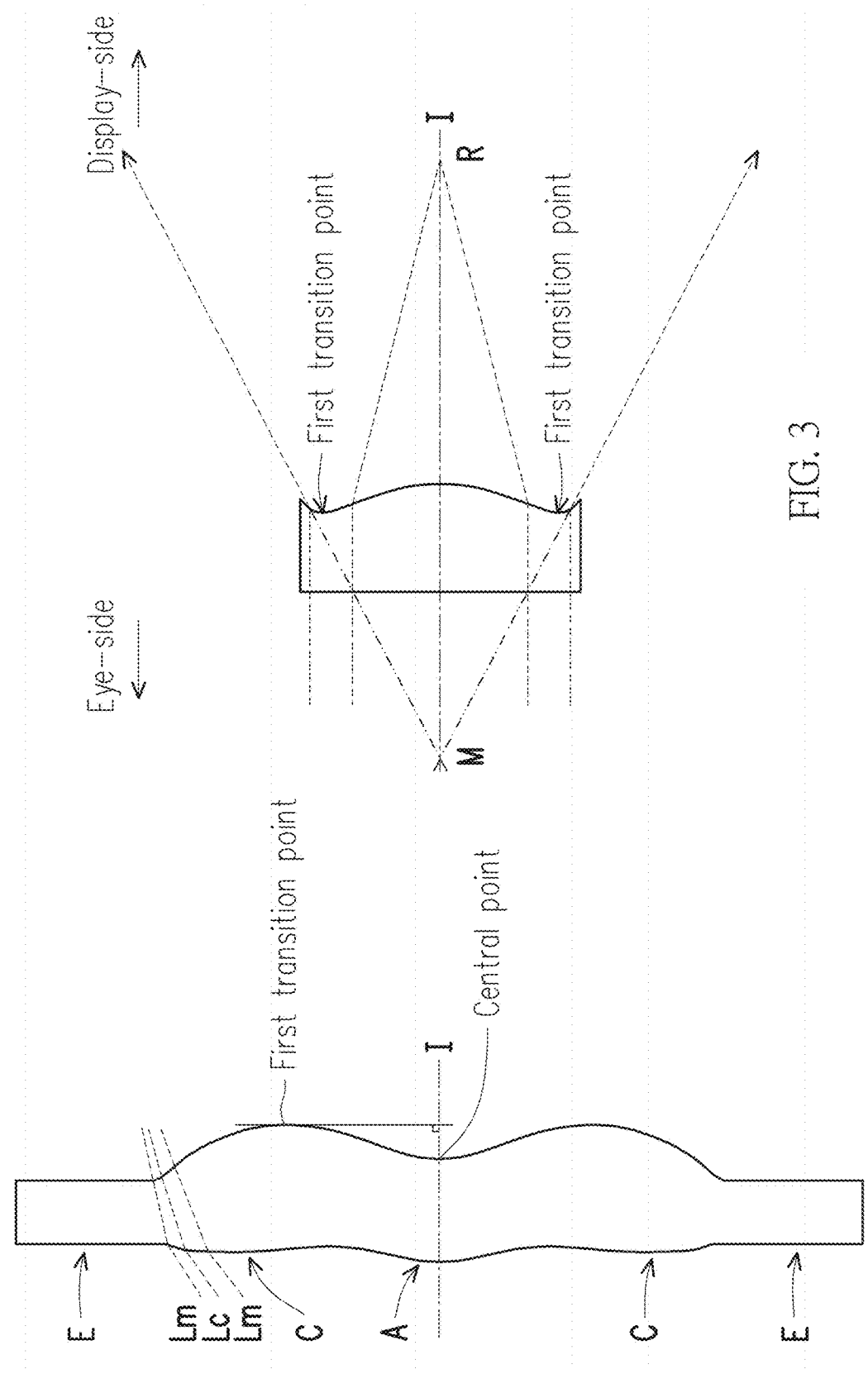

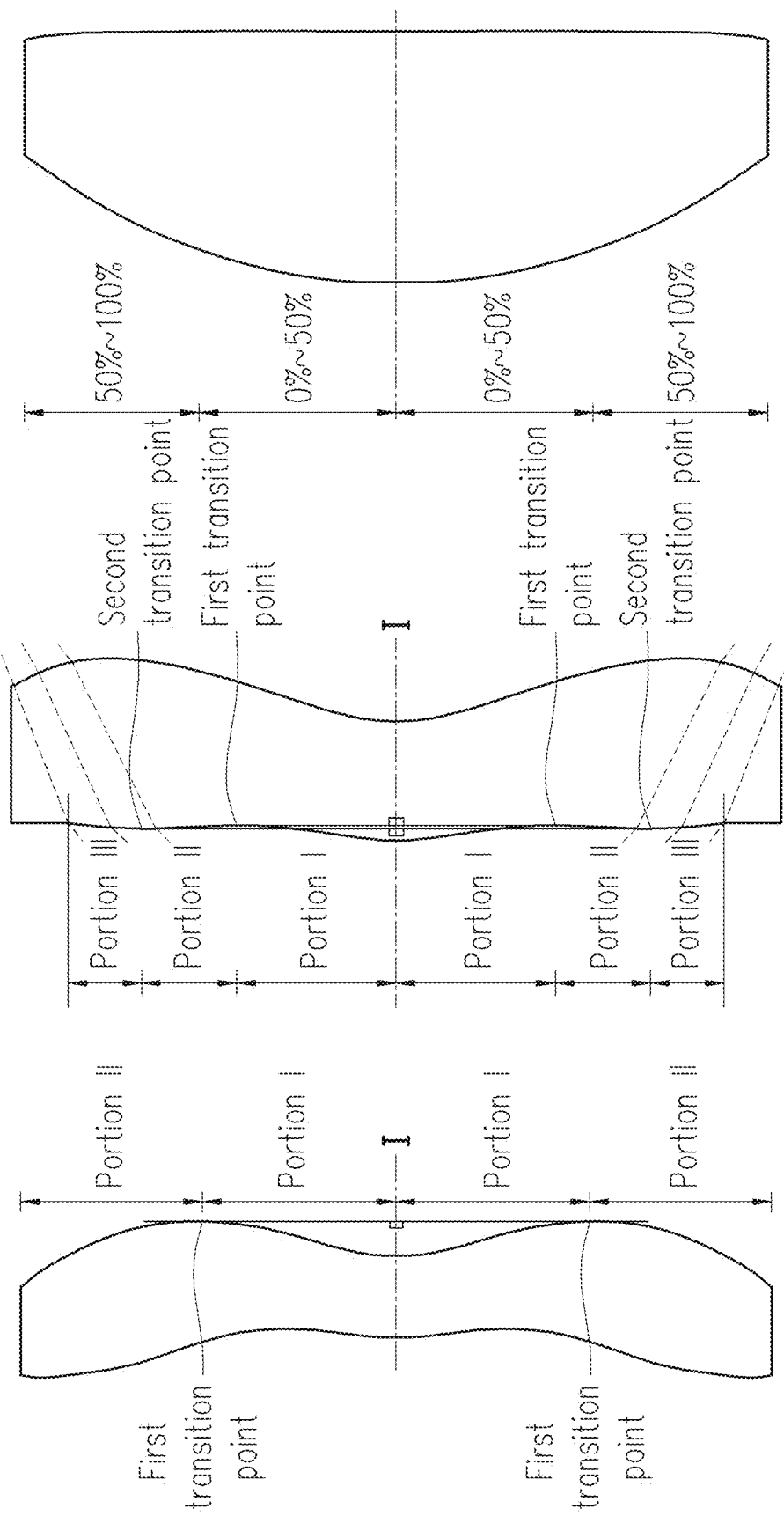

| Effective focal length (EFL) = 57.968 mm, ω (a half apparent field of view) = 45 deg., TTL (System length) = 68.706 mm, EPD= 4mm, 0.5DLD= 39.46mm, SL= 83.060mm | | | | | | | |
|---|---|---|---|---|---|---|---|
| Surface # | | Radius (mm) | Thickness (mm) | Semi-diameter | Refractive index | Abbe number | Focus (mm) |
| 100 | Aperture stop | ∞ | 14.3543 | 2.0000 | | | |
| 111 | 1st lens element | 164.3209 | 16.7827(T1) | 20.6845 | 1.623_n1 | 58.060_v1 | 44.784_f1 |
| 112 | | -32.2911 | 0.0375(G1) | 23.2029 | | | |
| 121 | 2nd lens element | -83.6621 | 6.1194(T2) | 23.6384 | 1.492_n2 | 57.441_v2 | 101.753_f2 |
| 122 | | -32.0669 | 0.5112(G2) | 24.6632 | | | |
| 131 | 3rd lens element | 1034.1045 | 6.0217(T3) | 26.3594 | 1.643_n3 | 22.437_v3 | -128.204_f3 |
| 132 | | 76.1655 | 14.1062(G3) | 31.2023 | | | |
| 141 | 4th lens element | -37.6503 | 4.0000(T4) | 32.7924 | 1.492_n4 | 57.441_v4 | -55.469_f4 |
| 142 | | 102.4960 | 21.1274(G4D) | 34.2315 | | | |
| 150 | Image plane | ∞ | | 39.8058 | | | |

FIG. 9

| Aspherical parameters | | | | |
|---|---|---|---|---|
| Surface # | 111 | 112 | 121 | 122 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | -1.018603E-05 | -1.094361E-05 |
| $a_6$ | 0.000000E+00 | 0.000000E+00 | -2.694300E-09 | 2.267746E-08 |
| Surface # | 131 | 132 | 141 | 142 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -1.938756E-05 | -8.722461E-06 | -1.719515E-06 | -1.230465E-05 |
| $a_6$ | 1.197526E-08 | 5.273010E-09 | 8.800710E-09 | -8.820700E-10 |

FIG. 10

| Effective focal length (EFL) = 43.172 mm, ω (a half apparent field of view) = 45 deg., TTL (System length) = 61.328 mm, EPD= 4mm, 0.5DLD= 27.59mm, SL= 73.328mm ||||||||
|---|---|---|---|---|---|---|---|
| Surface # | | Radius (mm) | Thickness (mm) | Semi-diameter | Refractive index | Abbe number | Focus (mm) |
| 200 | Aperture stop | ∞ | 12.0000 | 2.0000 | | | |
| 211 | 1st lens element | -211312.3014 | 11.0000(T1) | 13.9995 | 1.623_n1 | 58.060_v1 | 57.590_f1 |
| 212 | | -35.5385 | 0.0488(G1) | 17.1869 | | | |
| 221 | 2nd lens element | 43.4220 | 25.9582(T2) | 21.6488 | 1.492_n2 | 57.441_v2 | 43.698_f2 |
| 222 | | -34.1629 | 1.5073(G2) | 22.4097 | | | |
| 231 | 3rd lens element | -31.6377 | 10.0000(T3) | 22.1403 | 1.643_n3 | 22.437_v3 | -33.474_f3 |
| 232 | | 75.6300 | 7.2509(G3) | 25.1920 | | | |
| 241 | 4th lens element | -36.9311 | 4.0000(T4) | 25.6036 | 1.492_n4 | 57.441_v4 | -58.504_f4 |
| 242 | | 134.8689 | 1.5630(G4D) | 27.2001 | | | |
| 250 | Image plane | ∞ | | 27.6741 | | | |

FIG. 13

| Aspherical parameters | | | | |
|---|---|---|---|---|
| Surface # | 211 | 212 | 221 | 222 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | -1.796240E-06 | -1.073753E-05 |
| $a_6$ | 0.000000E+00 | 0.000000E+00 | 1.484170E-09 | 2.039723E-08 |
| Surface # | 231 | 232 | 241 | 242 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -1.136056E-05 | -2.640060E-06 | 1.743415E-05 | -9.817539E-06 |
| $a_6$ | 2.391225E-08 | 2.900180E-09 | 1.109420E-09 | 8.174950E-09 |

FIG. 14

| Effective focal length (EFL) = 72.149 mm, ω (a half apparent field of view) = 45 deg., TTL (System length) = 77.530 mm, EPD= 4mm, 0.5DLD= 48.946mm, SL= 97.478mm ||||||||
|---|---|---|---|---|---|---|---|
| Surface # | | Radius (mm) | Thickness (mm) | Semi-diameter | Refractive index | Abbe number | Focus (mm) |
| 300 | Aperture stop | ∞ | 19.9481 | 2.0000 | | | |
| 311 | 1st lens element | 324.3674 | 12.6827(T1) | 22.7462 | 1.623_n1 | 58.060_v1 | 52.770_f1 |
| 312 | | -36.0363 | 0.0386(G1) | 23.9625 | | | |
| 321 | 2nd lens element | -50.1804 | 4.9993(T2) | 24.3355 | 1.492_n2 | 57.441_v2 | 263.271_f2 |
| 322 | | -37.3518 | 16.7189(G2) | 25.2066 | | | |
| 331 | 3rd lens element | -35.2231 | 5.9901(T3) | 28.1605 | 1.643_n3 | 22.437_v3 | -103.937_f3 |
| 332 | | -79.4424 | 27.3552(G3) | 33.4840 | | | |
| 341 | 4th lens element | -48.2035 | 4.0000(T4) | 41.6888 | 1.492_n4 | 57.441_v4 | 63.443_f4 |
| 342 | | 90.8696 | 5.7448(G4D) | 43.1129 | | | |
| 350 | Image plane | ∞ | | 49.0607 | | | |

FIG. 17

| Aspherical parameters | | | | |
|---|---|---|---|---|
| Surface # | 311 | 312 | 321 | 322 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | -3.845298E-06 | -9.729789E-06 |
| $a_6$ | 0.000000E+00 | 0.000000E+00 | 1.310250E-09 | 1.468478E-08 |
| Surface # | 331 | 332 | 341 | 342 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -1.409490E-05 | -2.139364E-06 | -2.869114E-06 | -1.461306E-05 |
| $a_6$ | 1.763576E-08 | 2.155170E-09 | 2.647300E-09 | 3.036550E-09 |

FIG. 18

| Effective focal length (EFL) = 71.582 mm, ω (a half apparent field of view) = 45 deg., TTL (System length) = 73.670 mm, EPD= 4mm, 0.5DLD= 47.326mm, SL= 93.081mm ||||||||
| --- | --- | --- | --- | --- | --- | --- | --- |
| Surface # | | Radius (mm) | Thickness (mm) | Semi-diameter | Refractive index | Abbe number | Focus (mm) |
| 400 | Aperture stop | ∞ | 19.4109 | 2.0000 | | | |
| 411 | 1st lens element | -68109.8067 | 10.4335(T1) | 22.9799 | 1.623_n1 | 58.060_v1 | 59.486_f1 |
| 412 | | -37.0436 | 0.0300(G1) | 23.8311 | | | |
| 421 | 2nd lens element | -69.4605 | 5.6775(T2) | 25.5233 | 1.492_n2 | 57.441_v2 | 166.134_f2 |
| 422 | | -38.5543 | 20.0903(G2) | 26.3120 | | | |
| 431 | 3rd lens element | -35.6192 | 5.7055(T3) | 30.7533 | 1.643_n3 | 22.437_v3 | -213.200_f3 |
| 432 | | -51.1418 | 9.3888(G3) | 35.5725 | | | |
| 441 | 4th lens element | -48.6101 | 4.0000(T4) | 40.4324 | 1.492_n4 | 57.441_v4 | -61.034_f4 |
| 442 | | 80.5965 | 18.3445(G4D) | 41.2831 | | | |
| 450 | Image plane | ∞ | | 47.4425 | | | |

FIG. 21

| Aspherical parameters | | | | |
|---|---|---|---|---|
| Surface # | 411 | 412 | 421 | 422 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | 7.987186E-06 | 6.944784E-06 |
| $a_6$ | 0.000000E+00 | 0.000000E+00 | -5.802120E-09 | 3.335930E-09 |
| Surface # | 431 | 432 | 441 | 442 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.672340E-06 | 7.769586E-06 | 6.820672E-06 | -1.113641E-05 |
| $a_6$ | 1.179609E-08 | -1.686890E-09 | -5.157000E-10 | 2.784700E-09 |

FIG. 22

| Effective focal length (EFL) = 43.435 mm, ω (a half apparent field of view) = 45 deg., TTL (System length) = 48.560 mm, EPD= 4mm, 0.5DLD= 29.886mm, SL= 60.560mm ||||||||
|---|---|---|---|---|---|---|---|
| Surface # | | Radius (mm) | Thickness (mm) | Semi-diameter | Refractive index | Abbe number | Focus (mm) |
| 500 | Aperture stop | ∞ | 12.0000 | 2.0000 | | | |
| 511 | 1st lens element | -40.9438 | 6.5418(T1) | 12.1540 | 1.623_n1 | 58.060_v1 | 44.154_f1 |
| 512 | | -17.4632 | 0.1000(G1) | 13.5013 | | | |
| 521 | 2nd lens element | 70.2292 | 6.0165(T2) | 16.6963 | 1.492_n2 | 57.441_v2 | 39.552_f2 |
| 522 | | -26.1422 | 1.3649(G2) | 17.2037 | | | |
| 531 | 3rd lens element | -64.5869 | 3.2507(T3) | 19.1897 | 1.643_n3 | 22.437_v3 | -70.620_f3 |
| 532 | | 155.8644 | 5.4721(G3) | 21.5466 | | | |
| 541 | 4th lens element | -179.2963 | 2.7496(T4) | 21.7437 | 1.492_n4 | 57.441_v4 | -42.632_f4 |
| 542 | | 23.8619 | 23.0643(G4D) | 22.7174 | | | |
| 550 | Image plane | ∞ | | 29.8913 | | | |

FIG. 25

| Aspherical parameters | | | | |
|---|---|---|---|---|
| Surface # | 511 | 512 | 521 | 522 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | -2.167842E-05 | 1.741083E-05 |
| $a_6$ | 0.000000E+00 | 0.000000E+00 | 6.352558E-08 | 2.929692E-08 |
| $a_8$ | 0.000000E+00 | 0.000000E+00 | -1.079000E-10 | 1.234300E-10 |
| $a_{10}$ | 0.000000E+00 | 0.000000E+00 | -8.000000E-14 | 1.300000E-13 |
| Surface # | 531 | 532 | 541 | 542 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -8.119368E-06 | 6.456221E-06 | -3.112613E-05 | -1.007560E-04 |
| $a_6$ | 7.554259E-08 | 1.254624E-08 | 2.518732E-08 | 1.594964E-07 |
| $a_8$ | -8.315000E-11 | -3.077000E-11 | 4.727000E-11 | -2.902500E-10 |
| $a_{10}$ | 5.000000E-14 | -5.000000E-14 | 9.000000E-14 | 2.400000E-13 |

FIG. 26

| Effective focal length (EFL) = 27.819 mm, ω (a half apparent field of view) = 45 deg., TTL (System length) = 40.863 mm, EPD= 4mm, 0.5DLD= 23.912mm, SL= 52.863mm ||||||||
|---|---|---|---|---|---|---|---|
| Surface # | | Radius (mm) | Thickness (mm) | Semi-diameter | Refractive index | Abbe number | Focus (mm) |
| 600 | Aperture stop | ∞ | 12.0000 | 2.0000 | | | |
| 611 | 1st lens element | -91.8296 | 6.7986(T1) | 13.0655 | 1.623_n1 | 58.060_v1 | 40.849_f1 |
| 612 | | -20.4938 | 0.0999(G1) | 14.2157 | | | |
| 621 | 2nd lens element | 36.1446 | 11.8404(T2) | 18.2500 | 1.492_n2 | 57.441_v2 | 40.982_f2 |
| 622 | | -40.6370 | 1.1290(G2) | 18.3563 | | | |
| 631 | 3rd lens element | -133.7165 | 6.0958(T3) | 17.8458 | 1.643_n3 | 22.437_v3 | -41.792_f3 |
| 632 | | 34.2253 | 9.2940(G3) | 18.8867 | | | |
| 641 | 4th lens element | 37.1829 | 1.9999(T4) | 18.9057 | 1.492_n4 | 57.441_v4 | 161.363_f4 |
| 642 | | 68.7258 | 3.6055(G4D) | 22.4064 | | | |
| 650 | Image plane | ∞ | | 23.9861 | | | |

FIG. 29

| Aspherical parameters | | | | |
|---|---|---|---|---|
| Surface # | 611 | 612 | 621 | 622 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | 8.706946E-07 | -1.346313E-05 |
| $a_6$ | 0.000000E+00 | 0.000000E+00 | -4.739350E-09 | 1.987450E-08 |
| $a_8$ | 0.000000E+00 | 0.000000E+00 | -2.220000E-12 | 1.050000E-12 |
| $a_{10}$ | 0.000000E+00 | 0.000000E+00 | 0.000000E+00 | 1.000000E-14 |
| Surface # | 631 | 632 | 641 | 642 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -3.152109E-05 | -7.396095E-06 | -1.247757E-04 | 6.687601E-05 |
| $a_6$ | 1.318099E-08 | -9.953340E-09 | 9.328046E-08 | -3.250386E-07 |
| $a_8$ | 6.490000E-12 | -2.095000E-11 | 6.509000E-11 | 2.633300E-10 |
| $a_{10}$ | 8.000000E-14 | -5.000000E-14 | 2.000000E-14 | 3.600000E-13 |

FIG. 30

| Effective focal length (EFL) = 50.348 mm, ||||||||
| ω (a half apparent field of view) = 45 deg., ||||||||
| TTL (System length) = 66.377 mm, EPD= 4mm, 0.5DLD= 35.184mm, SL= 78.377mm ||||||||
| Surface # | | Radius (mm) | Thickness (mm) | Semi-diameter | Refractive index | Abbe number | Focus (mm) |
|---|---|---|---|---|---|---|---|
| 700 | Aperture stop | ∞ | 12.0000 | 2.0000 | | | |
| 711 | 1st lens element | -209.6886 | 3.7400(T1) | 13.5607 | 1.623_n1 | 58.060_v1 | 104.712_f1 |
| 712 | | -50.0979 | 7.4859(G1) | 14.6131 | | | |
| 721 | 2nd lens element | 46.8558 | 26.6331(T2) | 23.8695 | 1.492_n2 | 57.441_v2 | 40.107_f2 |
| 722 | | -27.6796 | 3.4228(G2) | 26.1166 | | | |
| 731 | 3rd lens element | -52.7181 | 2.3942(T3) | 25.8808 | 1.643_n3 | 22.437_v3 | -128.467_f3 |
| 732 | | -148.3366 | 2.1817(G3) | 29.1146 | | | |
| 741 | 4th lens element | -174.4246 | 3.6070(T4) | 29.2034 | 1.492_n4 | 57.441_v4 | -57.379_f4 |
| 742 | | 33.8935 | 16.9121(G4D) | 30.4985 | | | |
| 750 | Image plane | ∞ | | 35.1759 | | | |

FIG. 33

| Aspherical parameters | | | | |
|---|---|---|---|---|
| Surface # | 711 | 712 | 721 | 722 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | -5.301335E-06 | -2.229094E-05 |
| $a_6$ | 0.000000E+00 | 0.000000E+00 | 2.673440E-09 | 4.292998E-08 |
| $a_8$ | 0.000000E+00 | 0.000000E+00 | 3.530000E-12 | -7.270000E-12 |
| $a_{10}$ | 0.000000E+00 | 0.000000E+00 | -2.000000E-14 | -1.000000E-14 |
| Surface # | 731 | 732 | 741 | 742 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.156609E-05 | -7.212355E-06 | -2.070245E-05 | -3.149783E-05 |
| $a_6$ | 2.744984E-08 | 3.983260E-09 | 8.992820E-09 | 1.916460E-09 |
| $a_8$ | 1.604000E-11 | -4.590000E-12 | 6.070000E-12 | 5.580000E-12 |
| $a_{10}$ | 3.000000E-14 | 0.000000E+00 | 0.000000E+00 | 0.000000E+00 |

FIG. 34

| Effective focal length (EFL) = 81.380 mm, ω (a half apparent field of view) = 45 deg., TTL (System length) = 78.000 mm, EPD= 4mm, 0.5DLD= 52.329mm, SL= 90.000mm ||||||||
|---|---|---|---|---|---|---|---|
| Surface # | | Radius (mm) | Thickness (mm) | Semi-diameter | Refractive index | Abbe number | Focus (mm) |
| 800 | Aperture stop | ∞ | 12.0000 | 2.0000 | | | |
| 811 | 1st lens element | -206.4775 | 5.1317(T1) | 13.5546 | 1.623_n1 | 58.060_v1 | 59.255_f1 |
| 812 | | -31.6168 | 0.1000(G1) | 14.6080 | | | |
| 821 | 2nd lens element | 158.5296 | 18.9069(T2) | 17.4524 | 1.492_n2 | 57.441_v2 | 57.940_f2 |
| 822 | | -33.3722 | 2.5726(G2) | 19.5168 | | | |
| 831 | 3rd lens element | -29.6243 | 9.9572(T3) | 19.4706 | 1.643_n3 | 22.437_v3 | -68.680_f3 |
| 832 | | -101.8583 | 12.8773(G3) | 23.8197 | | | |
| 841 | 4th lens element | -26.3975 | 14.1553(T4) | 23.8517 | 1.492_n4 | 57.441_v4 | -31.915_f4 |
| 842 | | 45.5595 | 14.2990(G4D) | 39.0663 | | | |
| 850 | Image plane | ∞ | | 52.3690 | | | |

FIG. 37

| Aspherical parameters | | | | |
| --- | --- | --- | --- | --- |
| Surface # | 811 | 812 | 821 | 822 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | 6.102749E-06 | -7.165666E-06 |
| $a_6$ | 0.000000E+00 | 0.000000E+00 | 3.607570E-09 | 1.122984E-08 |
| $a_8$ | 0.000000E+00 | 0.000000E+00 | 2.600000E-12 | -1.059000E-11 |
| $a_{10}$ | 0.000000E+00 | 0.000000E+00 | 1.000000E-14 | 0.000000E+00 |
| Surface # | 831 | 832 | 841 | 842 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -2.366942E-05 | -1.129773E-05 | -1.907086E-05 | -4.094579E-05 |
| $a_6$ | 3.211656E-08 | -2.980500E-10 | 9.707650E-09 | 3.028359E-08 |
| $a_8$ | 4.920000E-12 | 7.800000E-13 | 7.980000E-12 | -5.450000E-12 |
| $a_{10}$ | 0.000000E+00 | 1.000000E-14 | 1.000000E-14 | 0.000000E+00 |

FIG. 38

| Effective focal length (EFL) = 49.121 mm, ω (a half apparent field of view) = 45 deg., TTL (System length) = 68.706 mm, EPD= 4mm, 0.5DLD= 33.582mm, SL= 78.710mm ||||||||
| --- | --- | --- | --- | --- | --- | --- | --- |
| Surface # | | Radius (mm) | Thickness (mm) | Semi-diameter | Refractive index | Abbe number | Focus (mm) |
| 900 | Aperture stop | ∞ | 12.0000 | 2.0000 | | | |
| 911 | 1st lens element | -413.5400 | 5.3646(T1) | 13.7706 | 1.623_n1 | 58.060_v1 | 55.749_f1 |
| 912 | | -32.2017 | 0.1000(G1) | 14.7833 | | | |
| 921 | 2nd lens element | 83.0509 | 23.3882(T2) | 17.6688 | 1.492_n2 | 57.441_v2 | 48.889_f2 |
| 922 | | -30.6979 | 1.3147(G2) | 19.5827 | | | |
| 931 | 3rd lens element | -31.4885 | 15.5959(T3) | 19.4033 | 1.643_n3 | 22.437_v3 | -57.548_f3 |
| 932 | | -252.4188 | 8.2490(G3) | 26.6413 | | | |
| 941 | 4th lens element | -36.2865 | 11.4409(T4) | 26.7182 | 1.492_n4 | 57.441_v4 | -56.656_f4 |
| 942 | | 132.4948 | 1.2567(G4D) | 33.9241 | | | |
| 950 | Image plane | ∞ | | 33.6003 | | | |

FIG. 41

| Aspherical parameters | | | | |
|---|---|---|---|---|
| Surface # | 911 | 912 | 921 | 922 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | 2.174740E-06 | -6.253045E-05 |
| $a_6$ | 0.000000E+00 | 0.000000E+00 | -2.868790E-09 | 8.751766E-08 |
| $a_8$ | 0.000000E+00 | 0.000000E+00 | -1.068600E-10 | 3.849000E-11 |
| $a_{10}$ | 0.000000E+00 | 0.000000E+00 | 5.500000E-13 | -1.400000E-13 |
| Surface # | 931 | 932 | 941 | 942 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.682179E-05 | -1.354091E-05 | -5.447599E-05 | -1.744079E-05 |
| $a_6$ | 6.034998E-08 | 2.514760E-09 | 8.782516E-08 | 2.505938E-08 |
| $a_8$ | 8.500000E-13 | 4.690000E-12 | -2.300000E-12 | -5.800000E-12 |
| $a_{10}$ | 1.100000E-13 | 1.000000E-14 | -3.000000E-14 | -1.000000E-14 |

FIG. 42

| Effective focal length（EFL）= 42.666 mm， ω（a half apparent field of view）= 45 deg.， TTL（System length）= 53.034 mm，EPD= 4mm，0.5DLD= 30.523mm，SL= 65.034mm ||||||||
|---|---|---|---|---|---|---|---|
| Surface # | | Radius (mm) | Thickness (mm) | Semi-diameter | Refractive index | Abbe number | Focus (mm) |
| 1000 | Aperture stop | ∞ | 12.0000 | 2.0000 | | | |
| 1011 | 1st lens element | 291.5377 | 2.9994(T1) | 14.3528 | 1.623_n1 | 58.060_v1 | 179.432_f1 |
| 1012 | | -180.5987 | 1.7378(G1) | 15.2602 | | | |
| 1021 | 2nd lens element | 65.8821 | 13.1677(T2) | 17.5973 | 1.492_n2 | 57.441_v2 | 34.092_f2 |
| 1022 | | -21.0071 | 4.5757(G2) | 18.5769 | | | |
| 1031 | 3rd lens element | 92.3863 | 3.8728(T3) | 20.5723 | 1.643_n3 | 22.437_v3 | -146.912_f3 |
| 1032 | | 45.9376 | 1.2626(G3) | 24.4478 | | | |
| 1041 | 4th lens element | 96.4568 | 2.9996(T4) | 25.0122 | 1.492_n4 | 57.441_v4 | -82.773_f4 |
| 1042 | | 28.3321 | 22.4182(G4D) | 25.7155 | | | |
| 1050 | Image plane | ∞ | | 30.5506 | | | |

FIG. 45

| Aspherical parameters | | | | |
|---|---|---|---|---|
| Surface # | 1011 | 1012 | 1021 | 1022 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | -2.053134E-05 | -1.155940E-05 |
| $a_6$ | 0.000000E+00 | 0.000000E+00 | -6.813700E-10 | 3.040791E-08 |
| $a_8$ | 0.000000E+00 | 0.000000E+00 | 2.655000E-11 | 5.120000E-12 |
| $a_{10}$ | 0.000000E+00 | 0.000000E+00 | 3.000000E-14 | 1.000000E-14 |
| Surface # | 1031 | 1032 | 1041 | 1042 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.470045E-05 | -2.180408E-05 | -1.734816E-05 | -4.006699E-05 |
| $a_6$ | 3.623867E-08 | -1.225490E-09 | 1.117745E-08 | 9.532670E-09 |
| $a_8$ | -8.834000E-11 | 1.126000E-11 | 4.640000E-12 | -1.269000E-11 |
| $a_{10}$ | 2.100000E-13 | 0.000000E+00 | 0.000000E+00 | 0.000000E+00 |

FIG. 46

| Effective focal length (EFL) = 49.961 mm, ω (a half apparent field of view) = 45 deg., TTL (System length) = 77.650 mm, EPD= 4mm, 0.5DLD= 33.882mm, SL= 89.650mm ||||||||
|---|---|---|---|---|---|---|---|
| Surface # | | Radius (mm) | Thickness (mm) | Semi-diameter | Refractive index | Abbe number | Focus (mm) |
| 11100 | Aperture stop | ∞ | 12.0000 | 2.0000 | | | |
| 11111 | 1st lens element | -222.6516 | 12.5861(T1) | 13.5841 | 1.623_n1 | 58.060_v1 | 57.667_f1 |
| 11112 | | -31.6070 | 1.4073(G1) | 17.5924 | | | |
| 11121 | 2nd lens element | 107.3423 | 31.6785(T2) | 20.8367 | 1.492_n2 | 57.441_v2 | 53.559_f2 |
| 11122 | | -31.5081 | 1.9651(G2) | 26.0487 | | | |
| 11131 | 3rd lens element | -30.3877 | 11.1010(T3) | 25.8189 | 1.643_n3 | 22.437_v3 | -69.690_f3 |
| 11132 | | -107.9407 | 7.7671(G3) | 30.0212 | | | |
| 11141 | 4th lens element | -39.2548 | 9.6681(T4) | 30.1707 | 1.492_n4 | 57.441_v4 | -57.067_f4 |
| 11142 | | 106.4403 | 1.4766(G4D) | 34.1819 | | | |
| 11150 | Image plane | ∞ | | 33.8814 | | | |

FIG. 49

| Aspherical parameters | | | | |
|---|---|---|---|---|
| Surface # | 11111 | 11112 | 11121 | 11122 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | 0.000000E+00 | 0.000000E+00 |
| $a_6$ | 0.000000E+00 | 0.000000E+00 | 3.720106E-06 | -2.583957E-05 |
| $a_8$ | 0.000000E+00 | 0.000000E+00 | -3.893947E-08 | 2.978638E-08 |
| $a_{10}$ | 0.000000E+00 | 0.000000E+00 | 1.128042E-11 | 6.483277E-12 |
| $a_{12}$ | 0.000000E+00 | 0.000000E+00 | 1.047007E-13 | -1.270549E-14 |
| Surface # | 11131 | 11132 | 11141 | 11142 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 0.000000E+00 | 0.000000E+00 | 0.000000E+00 | 0.000000E+00 |
| $a_6$ | -2.095243E-05 | 8.896972E-06 | -1.060934E-05 | -1.517423E-05 |
| $a_8$ | 4.250959E-08 | -1.033060E-08 | 1.485858E-08 | 9.171378E-09 |
| $a_{10}$ | -1.133105E-11 | -1.300871E-12 | 4.307945E-12 | 6.509835E-12 |
| $a_{12}$ | 3.160468E-16 | 1.976218E-15 | 7.123199E-16 | -9.905200E-18 |

FIG. 50

| Embodiment | 1st | 2nd | 3rd | 4th | 5th | 6th |
|---|---|---|---|---|---|---|
| ER | 14.35 | 12.00 | 19.95 | 19.41 | 12.00 | 12.00 |
| T1 | 16.78 | 11.00 | 12.68 | 10.43 | 6.54 | 6.80 |
| G12 | 0.037 | 0.049 | 0.039 | 0.03 | 0.1 | 0.10 |
| T2 | 6.12 | 25.96 | 5.00 | 5.68 | 6.02 | 11.84 |
| G23 | 0.51 | 1.51 | 16.72 | 20.09 | 1.36 | 1.13 |
| T3 | 6.02 | 10.00 | 5.99 | 5.71 | 3.25 | 6.10 |
| G34 | 14.11 | 7.25 | 27.36 | 9.39 | 5.47 | 9.29 |
| T4 | 4.00 | 4.00 | 4.00 | 4.00 | 2.75 | 2.00 |
| G4D | 21.13 | 1.56 | 5.74 | 18.34 | 23.06 | 3.61 |
| ALT | 32.92 | 50.96 | 27.67 | 25.82 | 18.56 | 26.73 |
| AAG | 14.65 | 8.81 | 44.11 | 29.51 | 6.94 | 10.52 |
| TTL | 68.71 | 61.33 | 77.53 | 73.67 | 48.56 | 40.86 |
| SL | 83.06 | 73.33 | 97.48 | 93.08 | 60.56 | 52.86 |
| G4D/AAG | 1.44 | 0.18 | 0.13 | 0.62 | 3.32 | 0.34 |
| 250/EFL | 4.31 | 5.79 | 3.47 | 3.49 | 5.76 | 8.99 |
| (AAG+G4D)/(G23+G34) | 2.45 | 1.18 | 1.13 | 1.62 | 4.39 | 1.36 |
| (AAG+G4D)/(T1+T4) | 1.72 | 0.69 | 2.99 | 3.32 | 3.23 | 1.61 |
| (G24+T4+G4D)/T1 | 1.53 | 0.64 | 2.09 | 4.07 | 4.15 | 0.99 |
| AAG/T1 | 0.87 | 0.80 | 3.48 | 2.83 | 1.06 | 1.55 |
| (ER+G4D)/(T2+G23) | 5.35 | 0.49 | 1.18 | 1.47 | 4.75 | 1.20 |
| (ER+G12+G24+G4D)/(T1+T3) | 1.58 | 0.72 | 2.27 | 3.59 | 3.73 | 1.31 |
| SL/EFL | 1.43 | 1.70 | 1.35 | 1.30 | 1.39 | 1.90 |
| SL/ALT | 2.52 | 1.44 | 3.52 | 3.61 | 3.26 | 1.98 |
| (AAG+G4D)/ER | 2.49 | 0.86 | 2.50 | 2.47 | 2.50 | 1.18 |
| (AAG+G4D)/(T3+G23) | 5.48 | 0.90 | 2.20 | 1.86 | 6.50 | 1.96 |
| (AAG+G4D)/(T3+T4) | 3.57 | 0.74 | 4.99 | 4.93 | 5.00 | 1.75 |
| (G23+T4+G4D)/T3 | 4.26 | 0.71 | 4.42 | 7.44 | 8.36 | 1.10 |
| AAG/G34 | 1.04 | 1.21 | 1.61 | 3.14 | 1.27 | 1.13 |
| (ER+G4D)/(T2+T4) | 3.51 | 0.45 | 2.85 | 3.90 | 4.00 | 1.13 |
| (ER+G12+G23+G4D)/(T1+G34) | 1.17 | 0.83 | 1.06 | 2.92 | 3.04 | 1.05 |
| TTL/AAG | 4.69 | 6.96 | 1.76 | 2.50 | 7.00 | 3.88 |
| TTL/ALT | 2.09 | 1.20 | 2.80 | 2.85 | 2.62 | 1.53 |

FIG. 51

| Embodiment | 7th | 8th | 9th | 10th | 11th |
|---|---|---|---|---|---|
| ER | 12.00 | 12.00 | 12.00 | 12.00 | 12.00 |
| T1 | 3.74 | 5.13 | 5.36 | 3.00 | 12.59 |
| G12 | 7.49 | 0.10 | 0.10 | 1.74 | 1.41 |
| T2 | 26.63 | 18.91 | 23.39 | 13.17 | 31.68 |
| G23 | 3.42 | 2.57 | 1.31 | 4.58 | 1.97 |
| T3 | 2.39 | 9.96 | 15.60 | 3.87 | 11.10 |
| G34 | 2.18 | 12.88 | 8.25 | 1.26 | 7.77 |
| T4 | 3.61 | 14.16 | 11.44 | 3.00 | 9.67 |
| G4D | 16.91 | 14.30 | 1.26 | 22.42 | 1.48 |
| ALT | 36.37 | 48.15 | 55.79 | 23.04 | 65.03 |
| AAG | 13.09 | 15.55 | 9.66 | 7.58 | 11.14 |
| TTL | 66.38 | 78.00 | 66.71 | 53.03 | 77.65 |
| SL | 78.38 | 90.00 | 78.71 | 65.03 | 89.65 |
| G4D/AAG | 1.29 | 0.92 | 0.13 | 2.96 | 0.13 |
| 250/EFL | 4.97 | 3.07 | 5.09 | 5.86 | 5.00 |
| (AAG+G4D)/(G23+G34) | 5.35 | 1.93 | 1.14 | 5.14 | 1.30 |
| (AAG+G4D)/(T1+T4) | 4.08 | 1.55 | 0.65 | 5.00 | 0.57 |
| (G24+T4+G4D)/T1 | 6.40 | 6.05 | 2.61 | 10.00 | 1.04 |
| AAG/T1 | 3.50 | 3.03 | 1.80 | 2.53 | 0.89 |
| (ER+G4D)/(T2+G23) | 0.96 | 1.22 | 0.54 | 1.94 | 0.40 |
| (ER+G12+G24+G4D)/(T1+T3) | 6.49 | 1.92 | 0.70 | 5.93 | 0.71 |
| SL/EFL | 1.56 | 1.11 | 1.60 | 1.52 | 1.79 |
| SL/ALT | 2.15 | 1.87 | 1.41 | 2.82 | 1.38 |
| (AAG+G4D)/ER | 2.50 | 2.49 | 0.91 | 2.50 | 1.05 |
| (AAG+G4D)/(T3+G23) | 5.16 | 2.38 | 0.65 | 3.55 | 0.97 |
| (AAG+G4D)/(T3+T4) | 5.00 | 1.24 | 0.40 | 4.36 | 0.61 |
| (G23+T4+G4D)/T3 | 10.00 | 3.12 | 0.90 | 7.74 | 1.18 |
| AAG/G34 | 6.00 | 1.21 | 1.17 | 6.00 | 1.43 |
| (ER+G4D)/(T2+T4) | 0.96 | 0.80 | 0.38 | 2.13 | 0.33 |
| (ER+G12+G23+G4D)/(T1+G34) | 6.72 | 1.61 | 1.08 | 9.56 | 0.83 |
| TTL/AAG | 5.07 | 5.02 | 6.90 | 7.00 | 6.97 |
| TTL/ALT | 1.82 | 1.62 | 1.20 | 2.30 | 1.19 |

FIG. 51A

OCULAR OPTICAL SYSTEM

CROSS REFERENCE TO RELATED APPLICATION

This application claims priority to P.R.C. Patent Application No. 201710020164.4, filed Jan. 11, 2017, and P.R.C. Patent Application No. 201711267559.0, filed Dec. 5, 2017, with the State Intellectual Property Office of the People's Republic of China (SIPO), which are incorporated herein by their entirety. Further, this application is a continuation-in-part of U.S. application Ser. No. 15/415,696, titled "OCULAR OPTICAL SYSTEM," filed Jan. 5, 2017, which also claims priority P.R.C. Patent Application No. 201710020164.4, which are incorporated herein by reference in its entirety.

TECHNICAL FIELD

The present disclosure relates to an ocular optical system, and particularly, relates to an ocular optical system having four lens elements.

BACKGROUND

Virtual reality (VR), computer technologies replicating a 3D virtual environment with realistic images, sounds and other sensations to simulate physical presence for an observer in the environment, may be dominated by VR devices providing visual experiences, such as ocular optical systems. Image frames in which a display screen is presented with respect to a view angle corresponding to one of the right eye or left eye, changed alternately, of the observer are shown to stimulate the observer's sense of stereopsis through the image which may be seen by the corresponding eye.

Some important characteristics of an ocular optical system include image quality and size. Improvements in image sensor technology play an important role in maintaining (or improving) consumer expectations related to image quality while making the devices more compact. However, a conventional ocular optical system has some drawbacks, such as an angle of view being too small and/or astigmatism and distortion aberrations being too large. Moreover, reducing the size of an imaging lens while maintaining and/or improving optical characteristics presents challenging problems.

In this manner, there is a continuing need for improving design characteristics of an ocular optical system that may have a larger angle of view while simultaneously maintaining and/or improving imaging quality.

SUMMARY

The present disclosure provides for ocular optical systems. By controlling the refracting power, surface shape and at least one inequality, the length of the ocular optical system may be shortened while maintaining good optical characteristics and system functionality, and preferably, the half apparent field of view (ω) of the ocular optical systems may be broadened, according to the present disclosure.

In an example embodiment, an ocular optical system for imaging of imaging rays entering eyes of an observer via the ocular optical system from a display screen, sequentially from an eye side to a display side along an optical axis, may comprise first, second, third and fourth lens elements, each of the first, second, third and fourth lens elements having an eye-side surface facing toward the eye side and a display-side surface facing toward the display side.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and a display screen along the optical axis, represented by G4D, a focusing length of the first lens element, represented by f1, a focusing length of the second lens element, represented by f2, a focusing length of the third lens element, represented by f3, a focusing length of the fourth lens element, represented by f4, the refracting power of the first lens element, represented by n1, the refracting power of the second lens element, represented by n2, the refracting power of the third lens element, represented by n3, the refracting power of the fourth lens element, represented by n4, an abbe number of the first lens element, represented by v1, an abbe number of the second lens element, represented by v2, an abbe number of the third lens element, represented by v3, an abbe number of the fourth lens element, represented by v4, an effective focal length of the ocular optical system, represented by EFL or f, a distance between the eye-side surface of the first lens element and the display-side surface of the fourth lens element along the optical axis, represented by TL, a distance between the eye-side surface of the first lens element and a display screen along the optical axis, represented by TTL, a sum of the central thicknesses of all four lens elements, i.e. a sum of T1, T2, T3 and T4, represented by ALT, a sum of all three air gaps from the first lens element to the fourth lens element along the optical axis, i.e. a sum of G12, G23 and G34, represented by AAG, a system distance of the ocular optical system, i.e. a distance from a pupil of the observer to the display screen along the optical axis, represented by SL, and a diagonal distance between a pupil of the observer to the corresponding display screen, represented by DLD.

In an aspect of the present disclosure, in the ocular optical system, the display-side surface of the first lens element may comprise a convex portion in a vicinity of the optical axis, the second lens element may comprise a positive refracting power, the third lens element may comprise a refracting power, the display-side surface of the fourth lens element may comprise a concave portion in a vicinity of the optical axis. In some embodiments, the ocular optical system may comprise no other lenses having refracting power beyond the first, second, third and fourth lens elements. In some embodiments, a distance between the display-side surface of the fourth lens element and the display screen along the optical axis is represented by G4D, a sum of all three air gaps from the first lens element to the fourth lens element along the optical axis is represented by AAG, and G4D and AAG may satisfy the inequality:

$$G4D/AAG \leq 7 \qquad \text{Inequality (1).}$$

In another aspect of the present disclosure, in the ocular optical system, the display-side surface of the first lens element may comprise a convex portion in a vicinity of the optical axis, the second lens element may comprise a positive refracting power, the third lens element may comprise a refracting power, at least one of the eye-side surface and the display-side surface of the fourth lens element may comprise aspherical surface. In some embodiments, the ocular optical system may comprise no other lenses having refracting power beyond the first, second, third and fourth lens elements. In some embodiments, a distance between the display-side surface of the fourth lens element and the display screen along the optical axis is represented by G4D, a sum of all three air gaps from the first lens element to the fourth lens element along the optical axis is represented by AAG, and G4D and AAG may satisfy the inequality:

$G4D/AAG \leq 4$.  Inequality (1').

In another example embodiment, other inequality(s), such as those relating to the ratio among parameters may be taken into consideration. For example:

$3 \leq 250/EFL \leq 15$  Inequality (2);

$(AAG+G4D)/(G23+G34) \leq 8.2$  Inequality (3);

$(AAG+G4D)/(T1+T4) \leq 5$  Inequality (4);

$(G23+T4+G4D)/T1 \leq 10$  Inequality (5);

$AAG/T1 \leq 3.5$  Inequality (6);

$(ER+G4D)/(T2+G23) \leq 6$  Inequality (7);

$(ER+G12+G23+G4D)/(T1+T3) \leq 16$  Inequality (8);

$SL/EFL \leq 1.9$  Inequality (9);

$SL/ALT \leq 4.3$  Inequality (10);

$(AAG+G4D)/ER \leq 2.5$  Inequality (11);

$(AAG+G4D)/(T3+G23) \leq 6.5$  Inequality (12);

$(AAG+G4D)/(T3+T4) \leq 5$  Inequality (13);

$(G23+T4+G4D)/T3 \leq 10$  Inequality (14);

$AAG/G34 \leq 6$  Inequality (15);

$(ER+G4D)/(T2+T4) \leq 4$  Inequality (16);

$(ER+G12+G23+G4D)/(T1+G34) \leq 20$  Inequality (17);

$TTL/AAG \leq 7$  Inequality (18); and/or $TTL/ALT \leq 2.9$  Inequality (19).

The above example embodiments are not limited and may be selectively incorporated in other embodiments described herein.

Through controlling the refracting power, the surface shape and at lease one inequality, the ocular optical system in example embodiments may achieve good optical characteristics and effectively shorten the length of the ocular optical system.

BRIEF DESCRIPTION OF THE DRAWINGS

Example embodiments will be more readily understood from the following detailed description when read in conjunction with the appended drawing, in which:

FIG. 2 depicts a cross-sectional view of one single lens element according to the present disclosure;

FIG. 3 depicts a schematic view of the relation between the surface shape and the optical focus of the lens element;

FIG. 4 depicts a schematic view of a first example of the surface shape and the effective radius of the lens element;

FIG. 5 depicts a schematic view of a second example of the surface shape and the effective radius of the lens element;

FIG. 6 depicts a schematic view of a third example of the surface shape and the effective radius of the lens element;

FIG. 9 depicts a table of optical data for each lens element of the ocular optical system of a first embodiment of the present disclosure;

FIG. 10 depicts a table of aspherical data of a first embodiment of the ocular optical system according to the present disclosure;

FIG. 13 depicts a table of optical data for each lens element of the ocular optical system of a second embodiment of the present disclosure;

FIG. 14 depicts a table of aspherical data of a second embodiment of the ocular optical system according to the present disclosure;

FIG. 17 depicts a table of optical data for each lens element of the ocular optical system of a third embodiment of the present disclosure;

FIG. 18 depicts a table of aspherical data of a third embodiment of the ocular optical system according to the present disclosure;

FIG. 21 depicts a table of optical data for each lens element of the ocular optical system of a fourth embodiment of the present disclosure;

FIG. 22 depicts a table of aspherical data of a fourth embodiment of the ocular optical system according to the present disclosure;

FIG. 25 depicts a table of optical data for each lens element of the ocular optical system of a fifth embodiment of the present disclosure;

FIG. 26 depicts a table of aspherical data of a fifth embodiment of the ocular optical system according to the present disclosure;

FIG. 29 depicts a table of optical data for each lens element of a sixth embodiment of an ocular optical system according to the present disclosure;

FIG. 30 depicts a table of aspherical data of a sixth embodiment of the ocular optical system according to the present disclosure;

FIG. 33 depicts a table of optical data for each lens element of the ocular optical system of a seventh embodiment of the present disclosure;

FIG. 34 depicts a table of aspherical data of a seventh embodiment of the ocular optical system according to the present disclosure;

FIG. 37 depicts a table of optical data for each lens element of the ocular optical system of an eighth embodiment of the present disclosure;

FIG. 38 depicts a table of aspherical data of an eighth embodiment of the ocular optical system according to the present disclosure;

FIG. 41 depicts a table of optical data for each lens element of the ocular optical system of a ninth embodiment of the present disclosure;

FIG. 42 depicts a table of aspherical data of a ninth embodiment of the ocular optical system according to the present disclosure;

FIG. 45 depicts a table of optical data for each lens element of the ocular optical system of a tenth embodiment of the present disclosure;

FIG. 46 depicts a table of aspherical data of a tenth embodiment of the ocular optical system according to the present disclosure;

FIG. 49 depicts a table of optical data for each lens element of the ocular optical system of a eleventh embodiment of the present disclosure;

FIG. 50 depicts a table of aspherical data of a eleventh embodiment of the ocular optical system according to the present disclosure; and FIG. 51 and FIG. 51A are tables for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the disclosed embodiments.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
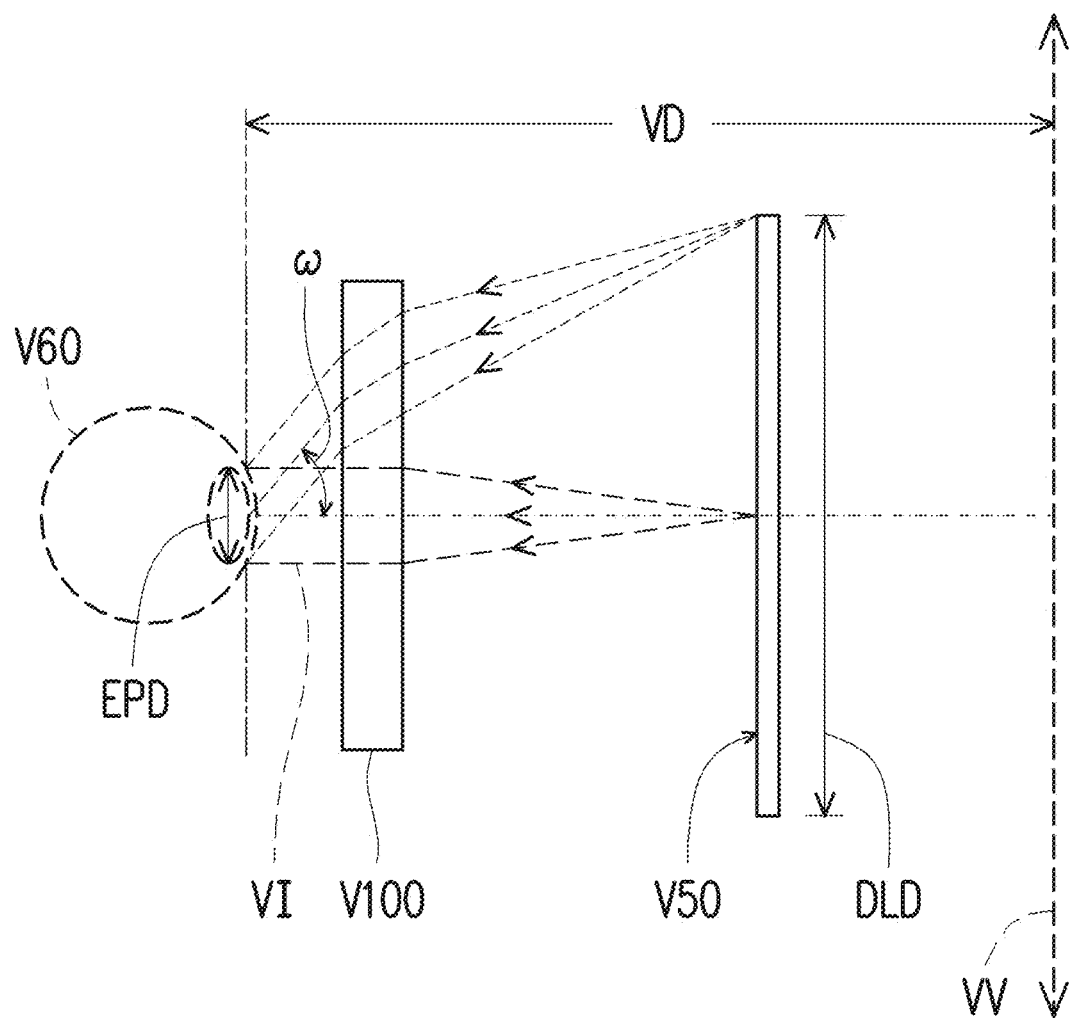
FIG. 1 depicts a schematic view of an ocular optical system according to the present disclosure.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a least distance of distinct vision VD, as depicted in FIG. 1. The following criteria for determining optical specifications of the present application are based on an assumption that a reverse tracking of the ray direction is parallel to imaging rays passing through the ocular optical system from an eye-side and focused on the display screen for imaging.

In the present specification, the description "a lens element having positive refracting power (or negative refracting power)" means that the paraxial refracting power of the lens element in Gaussian optics is positive (or negative). The description "An eye-side (or display-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, i.e. the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, i.e. the focal point of the ray is at the eye-side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis may have a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the eye-side or the display-side.

3. For none transition point cases that do not include transition points, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is determined as having a concave surface due to the R value at the display-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the eye-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the eye-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

In the present disclosure, example embodiments of an ocular optical system may comprise a first lens element, a second lens element, a third lens element and a fourth lens element, each of the lens elements may comprise refracting power, an eye-side surface facing toward an eye side and a display-side surface facing toward a display side and a central thickness defined along the optical axis. These lens elements may be arranged sequentially from the eye side to the display side along an optical axis, and example embodiments of the lens may comprise no other lenses having refracting power beyond the four lens elements. In an example embodiment, the display-side surface of the first lens element may comprise a convex portion in a vicinity of the optical axis, the second lens element may comprise a positive refracting power, the third lens element may comprise a refracting power, the display-side surface of the fourth lens element may comprise a concave portion in a vicinity of the optical axis. In another example embodiment: the display-side surface of the first lens element may comprise a convex portion in a vicinity of the optical axis, the second lens element may comprise a positive refracting power, the third lens element may comprise a refracting power, and at least one of the eye-side surface and the display-side surface of the fourth lens element may comprise aspherical surface. In yet another example embodiment, at least one inequality, such as selected from those relating to the ratio among parameters listed below, may be taken into consideration. For example:

| | |
|---|---|
| $G4D/AAG \leq 7$ | Inequality (1); |
| $G4D/AAG \leq 4$ | Inequality (1'); |
| $3 \leq 250/EFL \leq 15$ | Inequality (2); |
| $(AAG+G4D)/(G23+G34) \leq 8.2$ | Inequality (3); |
| $(AAG+G4D)/(T1+T4) \leq 5$ | Inequality (4); |
| $(G23+T4+G4D)/T1 \leq 10$ | Inequality (5); |
| $AAG/T1 \leq 3.5$ | Inequality (6); |
| $(ER+G4D)/(T2+G23) \leq 6$ | Inequality (7); |
| $(ER+G12+G23+G4D)/(T1+T3) \leq 16$ | Inequality (8); |
| $SL/EFL \leq 1.9$ | Inequality (9); |
| $SL/ALT \leq 4.3$ | Inequality (10); |
| $(AAG+G4D)/ER \leq 2.5$ | Inequality (11); |
| $(AAG+G4D)/(T3+G23) \leq 6.5$ | Inequality (12); |
| $(AAG+G4D)/(T3+T4) \leq 5$ | Inequality (13); |
| $(G23+T4+G4D)/T3 \leq 10$ | Inequality (14); |
| $AAG/G34 \leq 6$ | Inequality (15); |
| $(ER+G4D)/(T2+T4) \leq 4$ | Inequality (16); |
| $(ER+G12+G23+G4D)/(T1+G34) \leq 20$ | Inequality (17); |
| $TTL/AAG \leq 7$ | Inequality (18); and/or |
| $TTL/ALT \leq 2.9$ | Inequality (19). |

The lens elements are designed in light of the optical characteristics and the length of the ocular optical system. For example, the convex portion in a vicinity of the optical axis formed on the display-side surface of the first lens element, the positive refracting power of the second lens element, and the concave portion in a vicinity of the optical axis formed on the display-side surface of the fourth lens element may assist in enlarging the display screen. The aspherical surface of the at least one surface of the eye-side surface and the display-side surface of the fourth lens element may assist in adjusting aberrations which occur in the former three lens elements. When satisfying the Inequality (1), the aberrations which occur in the four lens elements may be further restrained through the designed size of the air gaps, and preferably satisfying the Inequality (1'), and further preferably satisfying $0.13 \leq G4D/AAG \leq 4$.

The ocular optical system may be designed with respect to a minimum distance for human eyes to focus of about 250 mm, and accordingly, the enlarge rate of the ocular optical system may approach the ratio of about 250 mm and EFL. When satisfying the Inequality (2), the systematical enlarge rate may be properly restrained to avoid excessive length, difficulty in the manufacture process, and lengthy EFL. When satisfying $40° \leq \omega$, tunnel vision which is undesirable for the observer may be avoided, and preferably $40° \leq \omega \leq 60°$.

To shorten the length of the ocular optical system, the thickness of the lens elements and/or the air gaps between the lens elements are required optionally for shorter distances; however, considering the difficulty to achieve the smaller dimensions of the ocular optical system set forth herein while maintaining imaging quality, the ocular optical system may be better configured if it satisfies Inequalities (3), (4), (5), (14), (15), (18), (19), and preferably, satisfies $0.5 \leq (AAG+G4)/(G2+G3) \leq 8.2$, $0.25 \leq (AAG+G4)/(T1+T4) \leq 5$, $0.5 \leq (G2+T4+G4)/T1 \leq 10$, $0.03 \leq AAG/T1 \leq 3.5$, $0.55 \leq SL/ALT \leq 4.3$, $0.32 \leq (AAG+G4)/(T3+G2) \leq 6.5$, $0.25 \leq (AAG+G4)/(T3+T4) \leq 5$, $0.4 \leq (G2+T4+G4)/T3 \leq 10$, $0.02 \leq AAG/G3 \leq 6$, $0.15 \leq TTL/AAG \leq 7$, and/or $0.34 \leq TTL/ALT \leq 2.9$.

To sustain proper values for the system focusing length and each parameter, as well as to avoid excessive large value that may be harmful to adjust aberrations or excessive small value that increases the difficulty in the manufacture process, here the Inequality (9) may be designed, and preferably, 0.2≤SL/EFL≤1.9 may be satisfied.

Satisfying Inequalities (7), (8), (11), (16), (17) may be beneficial to keep the parameters of ER (exit releaf) and other related parameters in a proper range so that excessively large value that may be harmful to comfortable experience of an observer or excessively small value that increases the difficulty in the manufacture process may be avoided. Preferably, 0.35≤(ER+G4)/(T2+G2)≤6, 0.7≤(ER+G1+G2+G4)/(T1+T3)≤16, 0.25≤(AAG+G4)/ER≤2.5, 0.3≤(ER+G4)/(T2+T4)≤4, and/or 0.8≤(ER+G1+G2+G4)/(T1+G3)≤20 may be satisfied.

In light of the unpredictability in an optical system, in the present disclosure, satisfying these inequalities listed above may result in shortening the length of the ocular optical system, enlarging ω, promoting the imaging quality and/or increasing the yield in the assembly process.

When implementing example embodiments, more details about the convex or concave surface may be incorporated for one specific lens element or broadly for plural lens elements to enhance the control for the system performance and/or resolution, or promote the yield. It is noted that the details listed here may be incorporated in example embodiments if no inconsistency occurs.

Figure 7:
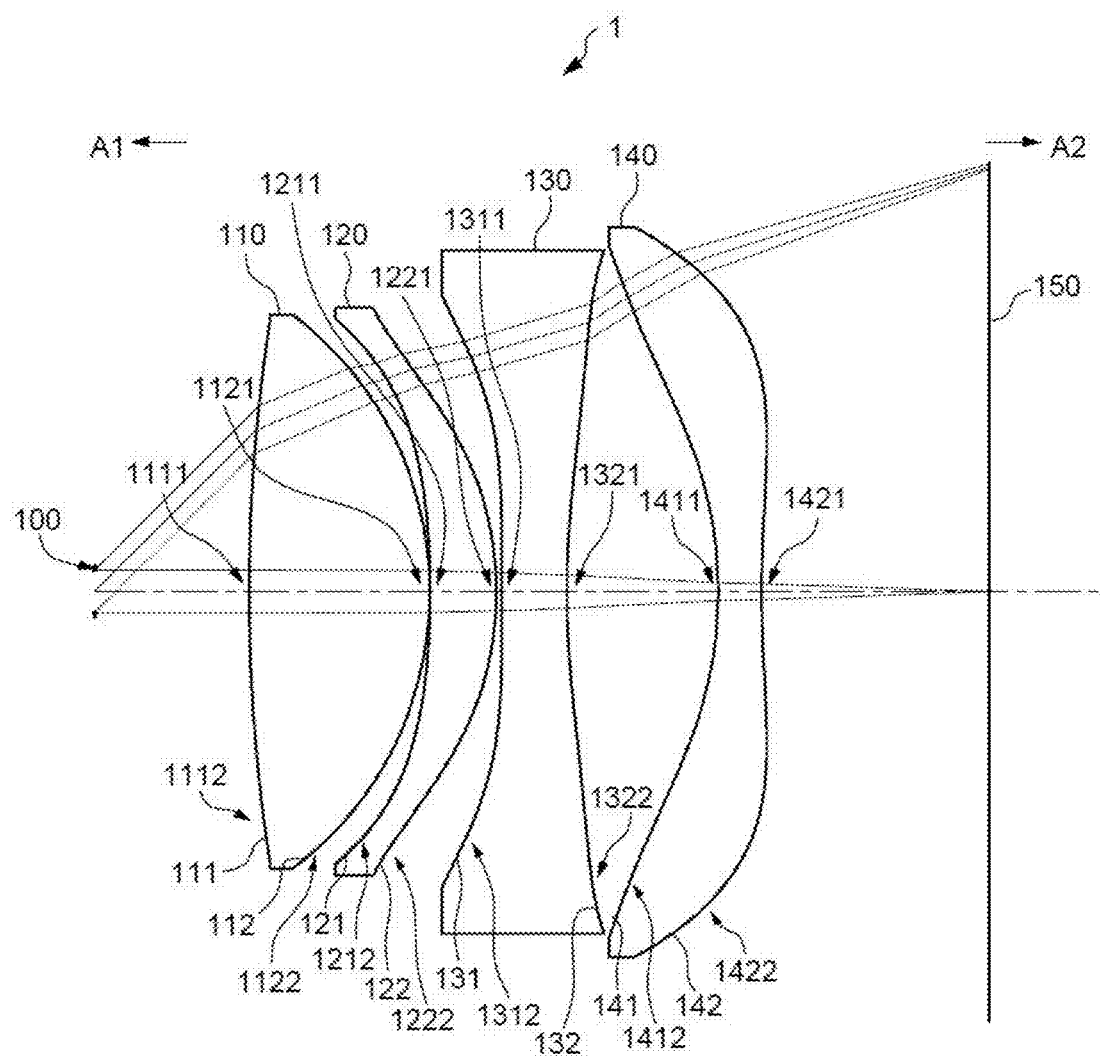
FIG. 7 depicts a cross-sectional view of a first embodiment of an ocular optical system having six lens elements according to the present disclosure.
Figure 8:
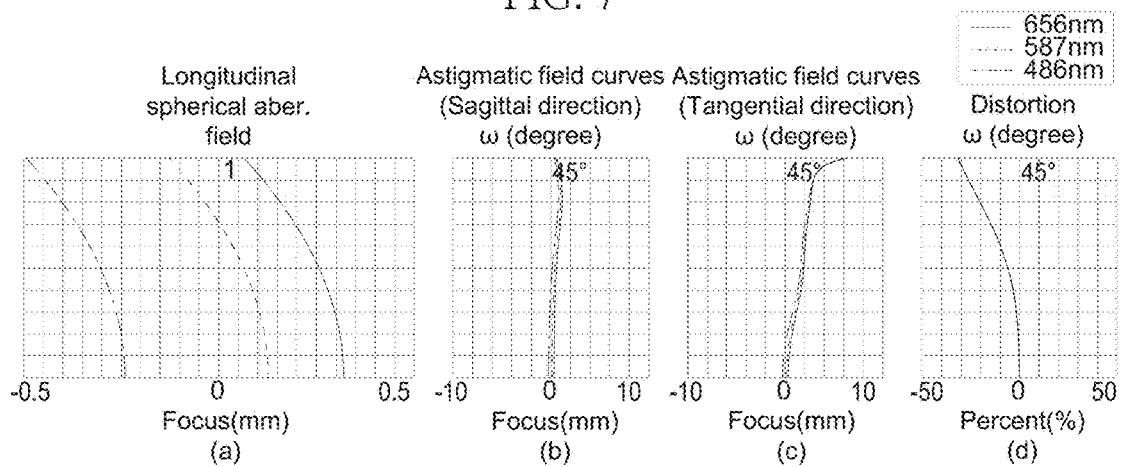
FIG. 8 depicts a chart of longitudinal spherical aberration and other kinds of optical aberrations of a first embodiment of the ocular optical system according to the present disclosure.

Several example embodiments and associated optical data will now be provided for illustrating example embodiments of an ocular optical system with short length, good optical characteristics and a wide view angle. Reference is now made to FIGS. 7-10. FIG. 7 illustrates an example cross-sectional view of an ocular optical system 1 having four lens elements of the ocular optical system according to a first example embodiment. FIG. 8 shows example charts of longitudinal spherical aberration and other kinds of optical aberrations of the ocular optical system 1 according to an example embodiment. FIG. 9 illustrates an example table of optical data of each lens element of the ocular optical system 1 according to an example embodiment. FIG. 10 depicts an example table of aspherical data of the ocular optical system 1 according to an example embodiment.

As shown in FIG. 7, the ocular optical system 1 of the first embodiment of the disclosure is used for imaging of imaging rays entering an eye of an observer via the ocular optical system 1 and a pupil 100 of the eye of the observer from a display screen 150. A side facing towards the eye is an eye-side A1, a side facing towards the display screen 150 is a display side A2. The embodiment of the ocular optical system 1 comprises a first lens element 110, a second lens element 120, and a third lens element 130 from the eye-side to the display-side in order along an optical axis. Each of the first, second, third, fourth lens elements 110, 120, 130, 140 may comprise an eye-side surface 111/121/131/141 and a display-side surface 112/122/132/142. In the present embodiment, the ocular optical system 1 may be designed with reference to an exit pupil diameter (EPD) and a minimum distance for human eyes to focus of 250 mm.

Example embodiments of each lens element of the ocular optical system 1 which may be constructed by glass, plastic material or other transparent material will now be described with reference to the drawings.

An example embodiment of the first lens element 110, which may be constructed by plastic material, may have positive refracting power. The eye-side surface 111 may be a convex surface comprising a convex portion 1111 in a vicinity of the optical axis and a convex portion 1112 in a vicinity of a periphery of the first lens element 110. The display-side surface 112 may be a convex surface comprising a convex portion 1121 in a vicinity of the optical axis and a convex portion 1122 in a vicinity of the periphery of the first lens element 110.

An example embodiment of the second lens element 120, which may be constructed by plastic material, may have positive refracting power. The eye-side surface 121 may be a concave surface comprising a concave portion 1211 in a vicinity of the optical axis and a concave portion 1212 in a vicinity of a periphery of the second lens element 120. The display-side surface 122 may be a convex surface comprising a convex portion 1221 in a vicinity of the optical axis and a convex portion 1222 in a vicinity of the periphery of the second lens element 120.

An example embodiment of the third lens element 130, which may be constructed by plastic material, may have negative refracting power. The eye-side surface 131 may comprise a convex portion 1311 in a vicinity of the optical axis and a concave portion 1312 in a vicinity of a periphery of the third lens element 130. The display-side surface 132 may be a concave surface comprising a concave portion 1321 in a vicinity of the optical axis and a concave portion 1322 in a vicinity of the periphery of the third lens element 130.

An example embodiment of the fourth lens element 140, which may be constructed by plastic material, may have negative refracting power. The eye-side surface 141 may be a concave surface comprising a concave portion 1411 in a vicinity of the optical axis and a concave portion 1412 in a vicinity of a periphery of the fourth lens element 140. The display-side surface 142 may comprise a concave portion 1421 in a vicinity of the optical axis and a convex portion 1422 in a vicinity of the periphery of the fourth lens element 140.

In example embodiments, air gaps may exist between each pair of lens elements. Air gaps may exist between the first and second lens elements 110, 120, the second and third lens elements 120, 130, the third and fourth lens elements, 130, 140, and the fourth lens element 140 and the display plane 150; however, the profiles of opposite surfaces of two adjacent lens elements may correspond to each other, and in such situations, the air gap may not exist. As used throughout, the air gap between the first and second lens elements 110, 120 is denoted by G12, the air gap between the second and third lens elements 120, 130 is denoted by G23, the air gap between the third and fourth lens element 130, 140 is denoted by G34, and the sum of G12, G23 and G34 is denoted by AAG. Please note, in other embodiments, any of the aforementioned air gaps may or may not exist.

FIG. 9 depicts the optical data of each lens elements in the ocular optical system 1 of the present embodiment, and please refer to FIG. 51 for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT corresponding to the present embodiment.

In the present embodiment, the eye-side surface 111 and the display-side surface 112 of the first lens element 110 are spherical surfaces. The aspherical surfaces, including the eye-side surface 121 and the display-side surface 122 of the second lens element 120, the eye-side surface 131 and the display-side surface 132 of the third lens element 130, the eye-side surface 141 and the display-side surface 142 of the fourth lens element 140, are all defined by the following aspherical formula:

$$Z(Y) = \frac{Y^2}{R} \Big/ \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 10.

FIG. 8(a) shows the longitudinal spherical aberration, wherein the horizontal axis of FIG. 8(a) defines the focus, and the vertical axis of FIG. 8(a) defines the field of view. FIG. 8(b) shows the astigmatism aberration in the sagittal direction, wherein the horizontal axis of FIG. 8(b) defines the focus, and the vertical axis of FIG. 8(b) defines the half apparent field of view. FIG. 8(c) shows the astigmatism aberration in the tangential direction, wherein the horizontal axis of FIG. 8(c) defines the focus, and the vertical axis of FIG. 8(c) defines the half apparent field of view. FIG. 8(d) shows the variation of the distortion aberration, wherein the horizontal axis of FIG. 8(d) defines the percentage, and the vertical axis of FIG. 8(d) defines the half apparent field of view. The three curves with different wavelengths (486 nm, 587 nm, 656 nm) represent that off-axis light with respect to these wavelengths may be focused around an image point. From the vertical deviation of each curve shown in FIG. 8(a), the offset of the off-axis light relative to the image point may be within about ±0.5 mm. Therefore, the first embodiment may improve the longitudinal spherical aberration with respect to different wavelengths. Referring to FIG. 8(b), the focus variation with respect to the three different wavelengths (486 nm, 587 nm, 656 nm) in the whole field may fall within about ±1 mm. Referring to FIG. 8(c), the focus variation with respect to the three different wavelengths (486 nm, 587 nm, 656 nm) in the whole field may fall within about ±8 mm. Referring to FIG. 8(d), the horizontal axis of FIG. 8(d), the variation of the distortion aberration may be within about ±40%.

According to the value of the aberrations, it is shown that the ocular optical system 1 of the present embodiment, with the length as short as about 68.706 mm and ω as great as about 45 degrees, may be capable of providing good imaging quality as well as good optical characteristics.

Figure 11:
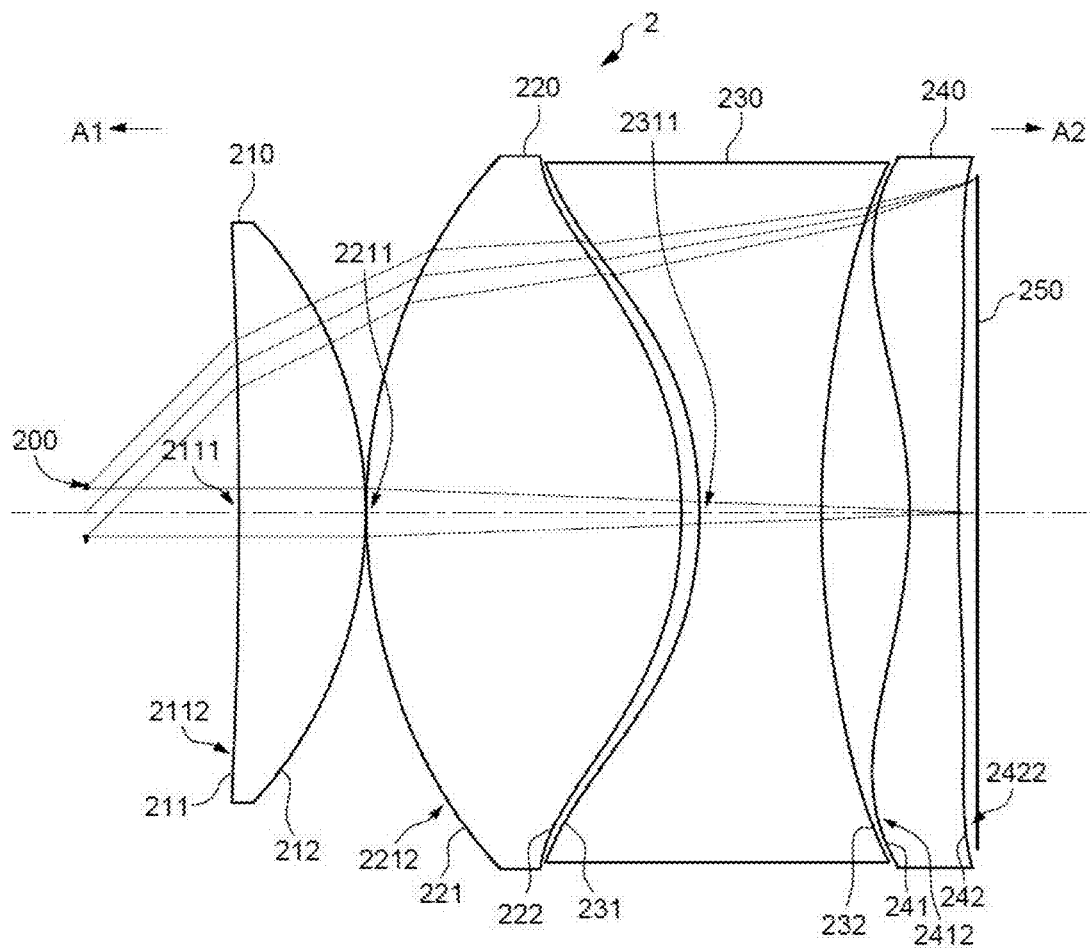
FIG. 11 depicts a cross-sectional view of a second embodiment of an ocular optical system having six lens elements according to the present disclosure.
Figure 12:
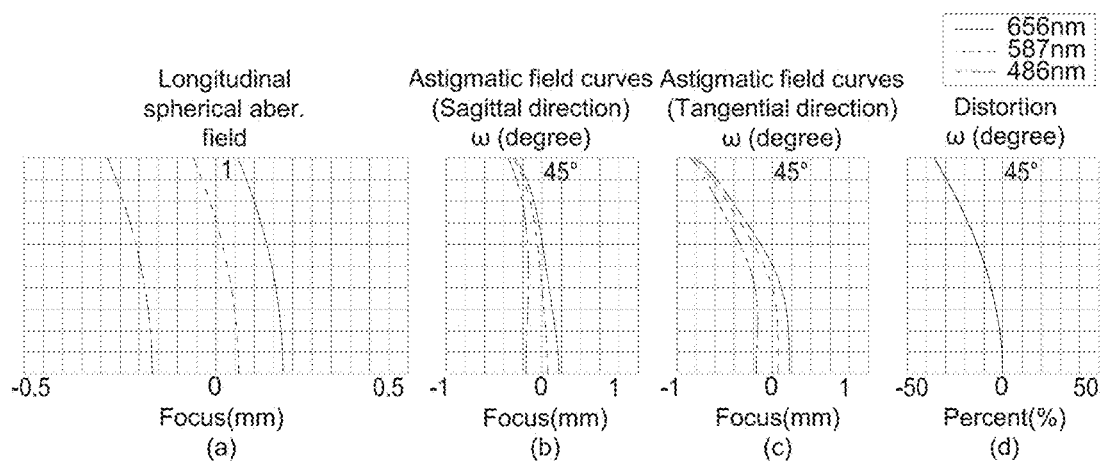
FIG. 12 depicts a chart of longitudinal spherical aberration and other kinds of optical aberrations of a second embodiment of the ocular optical system according the present disclosure.

Reference is now made to FIGS. 11-14. FIG. 11 illustrates an example cross-sectional view of an ocular optical system 2 having four lens elements of the ocular optical system according to a second example embodiment. FIG. 12 shows example charts of longitudinal spherical aberration and other kinds of optical aberrations of the ocular optical system 2 according to the second example embodiment. FIG. 13 shows an example table of optical data of each lens element of the ocular optical system 2 according to the second example embodiment. FIG. 14 shows an example table of aspherical data of the ocular optical system 2 according to the second example embodiment. The reference numbers labeled in the present embodiment are similar to those in the first embodiment for the similar elements, but here the reference numbers are initialed with 2, for example, reference number 231 for labeling the eye-side surface of the third lens element 230, reference number 232 for labeling the display-side surface of the third lens element 230, etc.

As shown in FIG. 11, the ocular optical system 2 of the present embodiment, in an order from an eye side A1 facing to a pupil of an observer 200 to a display side A2 facing to a display plane 250 along an optical axis, may comprise a first lens element 210, a second lens element 220, a third lens element 230 and a fourth lens element 240.

The differences between the second embodiment and the first embodiment may include the radius of curvature, thickness of each lens element, the distance of each air gap, aspherical data, related optical parameters, such as back focal length, as shown in FIGS. 13 and 14, and the configuration of the concave/convex shape of the eye-side surfaces 211, 221, 231, 241; but the configuration of the concave/convex shape of surfaces, comprising the display-side surfaces 212, 222, 232 facing to the display side A2, are similar to those in the first embodiment. Specifically, the eye-side surface 211 of the first lens element 210 may comprise a concave surface comprising a concave portion 2111 in a vicinity of the optical axis and a concave portion 2112 in a vicinity of a periphery of the first lens element 210; the eye-side surface 221 of the second lens element 220 may comprise a convex surface comprising a convex portion 2211 in a vicinity of the optical axis and a convex portion 2212 in a vicinity of a periphery of the second lens element 220; the eye-side surface 231 of the third lens element 230 may comprise a concave portion 2311 in a vicinity of the optical axis; the eye-side surface 241 of the fourth lens element 240 may comprise a convex portion 2412 in a vicinity of a periphery of the fourth lens element 240; and the display-side surface 242 of the fourth lens element 240 may comprise a concave portion 2422 in a vicinity of the periphery of the fourth lens element 240. Here and in the embodiments hereinafter, for clearly showing the drawings of the present embodiment, only the surface shapes which are different from that in the first embodiment are labeled. Please refer to FIG. 13 for the optical data of each lens elements in the ocular optical system 2 the present embodiment, and please refer to FIG. 51 for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

From the vertical deviation of each curve shown in FIG. 12(a), the offset of the off-axis light relative to the image point may be within about ±0.3 mm. Referring to FIG. 12(b), the focus variation with respect to the three different wavelengths (486 nm, 587 nm, 656 nm) in the whole field may fall within about ±0.4 mm. Referring to FIG. 12(c), the focus variation with respect to the three different wavelengths (486 nm, 587 nm, 656 nm) in the whole field may fall within about ±1 mm. Referring to FIG. 12(d), the variation of the distortion aberration of the ocular optical system 2 may be within about ±40%.

Compared with the first embodiment, the longitudinal spherical aberration and astigmatism aberration both in the sagittal and tangential directions of the ocular optical system 2 are less, and the system length of the ocular optical system 2 may be shorter. According to the value of the aberrations, it is shown that the ocular optical system 2 of the present embodiment, with the length as short as about 61.328 mm and ω as large as about 45 degrees, may be capable of providing good imaging quality as well as good optical characteristics.

Figure 15:
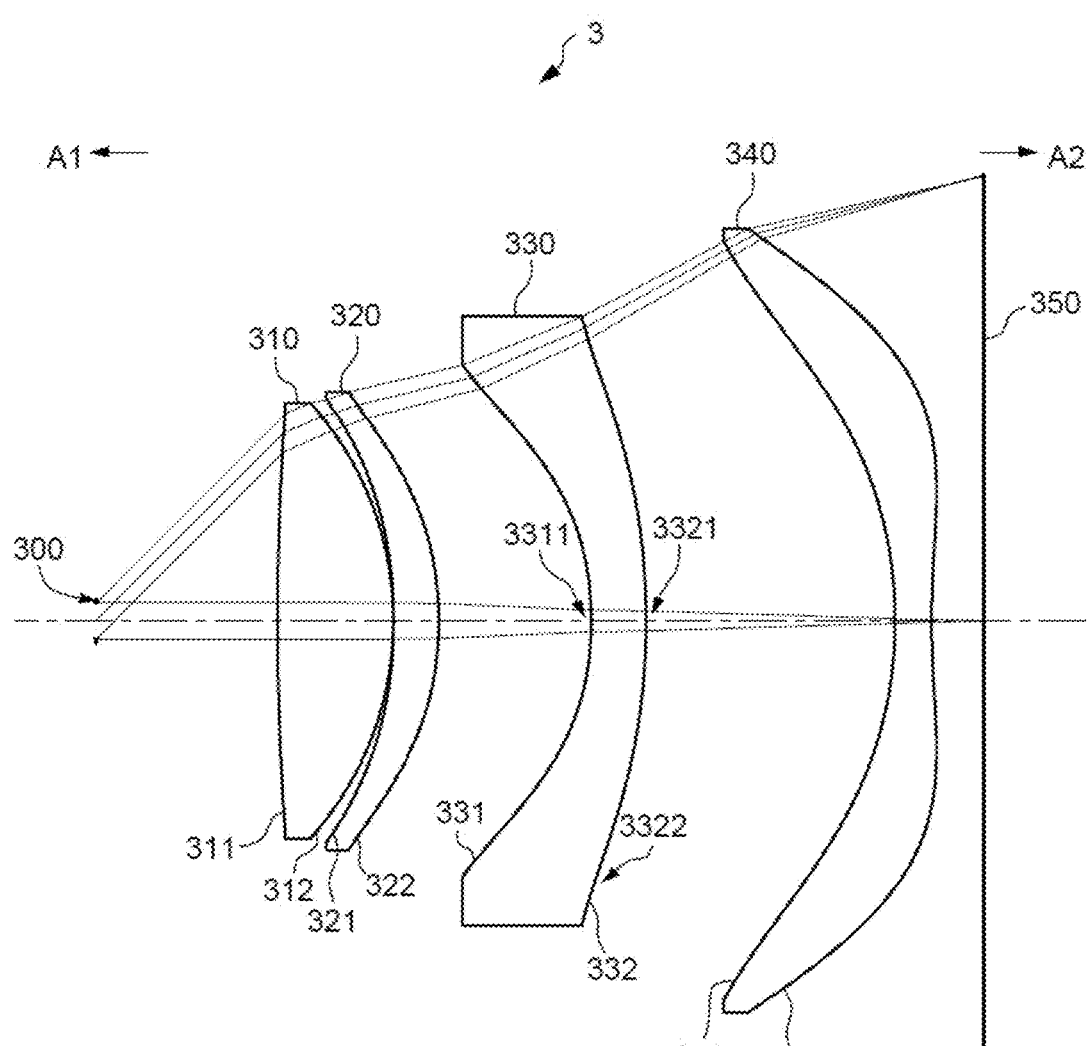
FIG. 15 depicts a cross-sectional view of a third embodiment of an ocular optical system having six lens elements according to the present disclosure.
Figure 16:
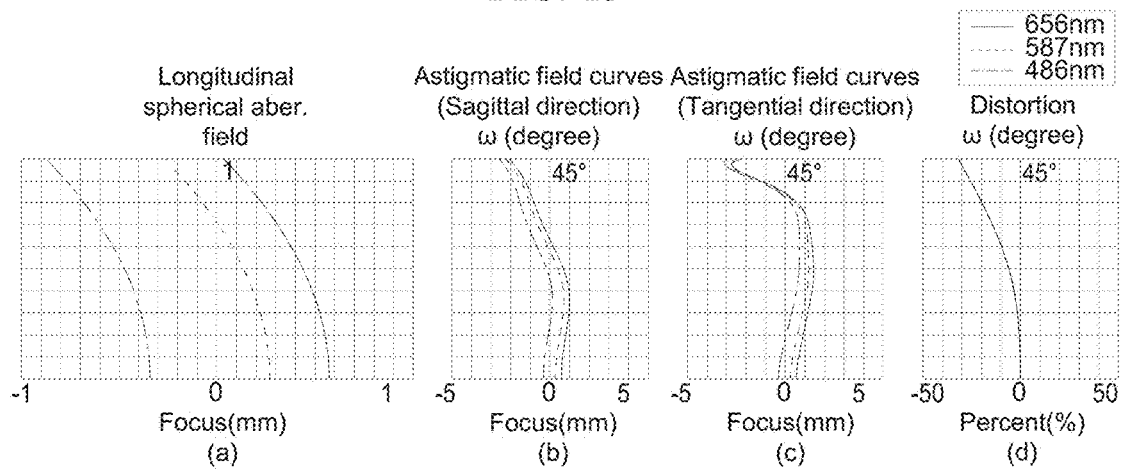
FIG. 16 depicts a chart of longitudinal spherical aberration and other kinds of optical aberrations of a third embodiment of the ocular optical system according the present disclosure.

Reference is now made to FIGS. 15-18. FIG. 15 illustrates an example cross-sectional view of an ocular optical system 3 having four lens elements of the ocular optical system 3 according to a third example embodiment. FIG. 16 shows example charts of longitudinal spherical aberration and other kinds of optical aberrations of the ocular optical system 3 according to the third example embodiment. FIG. 17 shows an example table of optical data of each lens element of the ocular optical system 3 according to the third example embodiment. FIG. 18 shows an example table of aspherical data of the ocular optical system 3 according to the third example embodiment. The reference numbers labeled in the present embodiment are similar to those in the first embodiment for the similar elements, but here the reference numbers are initialed with 3, for example, reference number 331 for labeling the eye-side surface of the third lens element 330, reference number 332 for labeling the display-side surface of the third lens element 330, etc.

As shown in FIG. 15, the ocular optical system 3 of the present embodiment, in an order from an eye side A1 facing to a pupil of an observer 300 to a display side A2 facing to a display plane 250 along an optical axis, may comprise a first lens element 310, a second lens element 320, a third lens element 330 and a fourth lens element 340.

The differences between the third embodiment and the first embodiment may include the radius of curvature and thickness of each lens element, the distance of each air gap, aspherical data, related optical parameters, such as back focal length, as shown in FIGS. 17 and 18, and the configuration of the concave/convex shape of the eye-side surface 331 and the display-side surface 332; but the configuration of the concave/convex shape of surfaces, comprising the eye-side surfaces 311, 321, 341 facing to the eye side A1 and the display-side surfaces 312, 322, 342 facing to the display side A2, are similar to those in the first embodiment, and the fourth lens element 340 may have positive refracting power. Specifically, the eye-side surface 331 of the third lens element 330 may comprise a concave portion 3311 in a vicinity of the optical axis; and the display-side surface 332 of the third lens element 330 may comprise a convex surface comprising a convex portion 3321 in a vicinity of the optical axis and a convex portion 3322 in a vicinity of a periphery of the third lens element 330. Please refer to FIG. 17 for the optical data of each lens elements in the ocular optical system 3 of the present embodiment, and please refer to FIG. 51 for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

From the vertical deviation of each curve shown in FIG. 16(a), the offset of the off-axis light relative to the image point may be within about ±1 mm. Referring to FIG. 16(b), the focus variation with respect to the three different wavelengths (486 nm, 587 nm, 656 nm) in the whole field may fall within about ±3 mm. Referring to FIG. 16(c), the focus variation with respect to the three different wavelengths (486 nm, 587 nm, 656 nm) in the whole field may fall within about ±4 mm. Referring to FIG. 16(d), the variation of the distortion aberration of the ocular optical system 3 may be within about ±35%.

Compared with the first embodiment, the astigmatism aberration in the tangential direction and the distortion aberration of the ocular optical system 3 are less. According to the value of the aberrations, it is shown that the ocular optical system 3 of the present embodiment, with the length as short as about 77.530 mm and ω as large as about 45 degrees, may be capable of providing good imaging quality as well as good optical characteristics.

Figure 19:
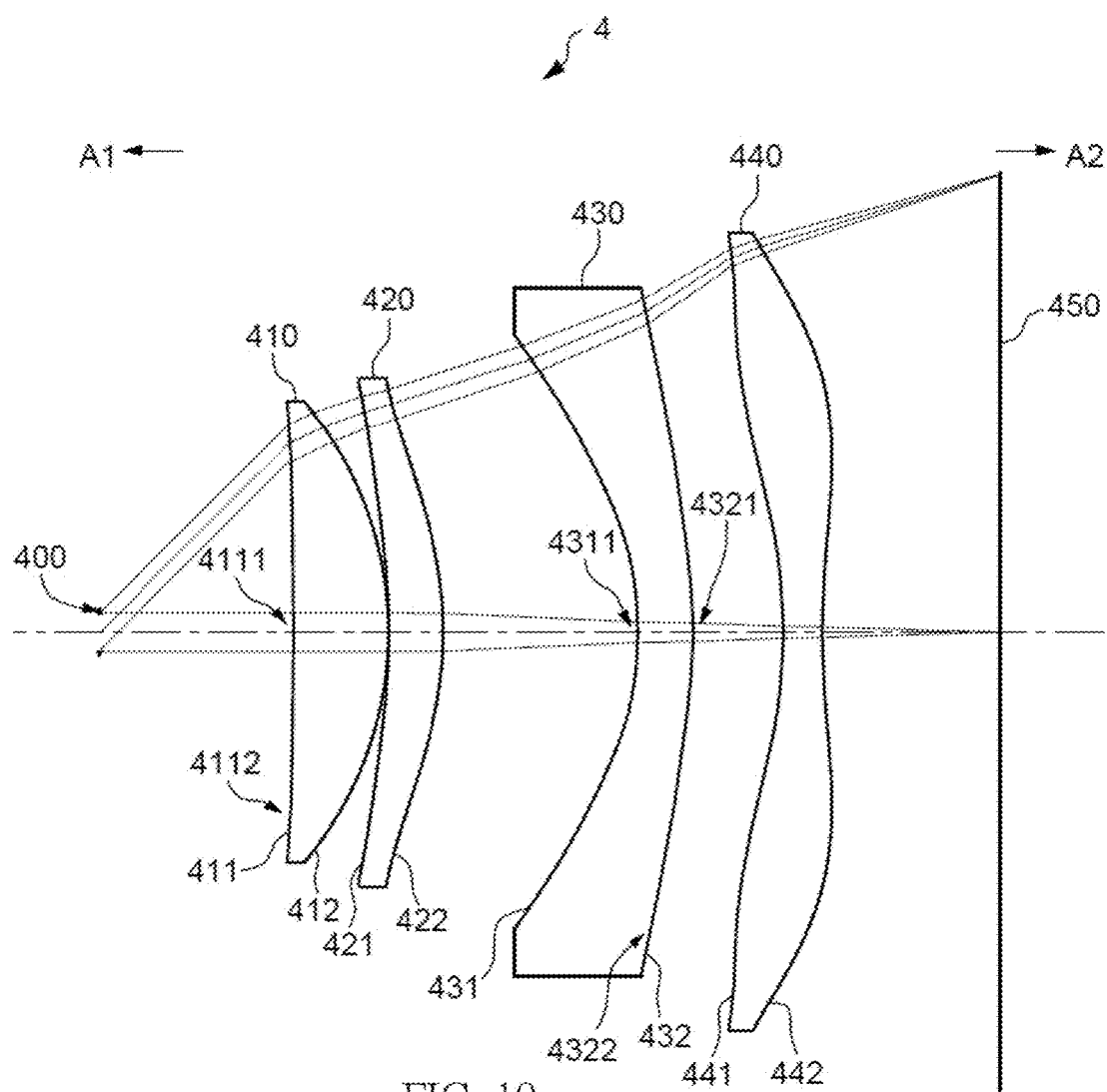
FIG. 19 depicts a cross-sectional view of a fourth embodiment of an ocular optical system having six lens elements according to the present disclosure.
Figure 20:
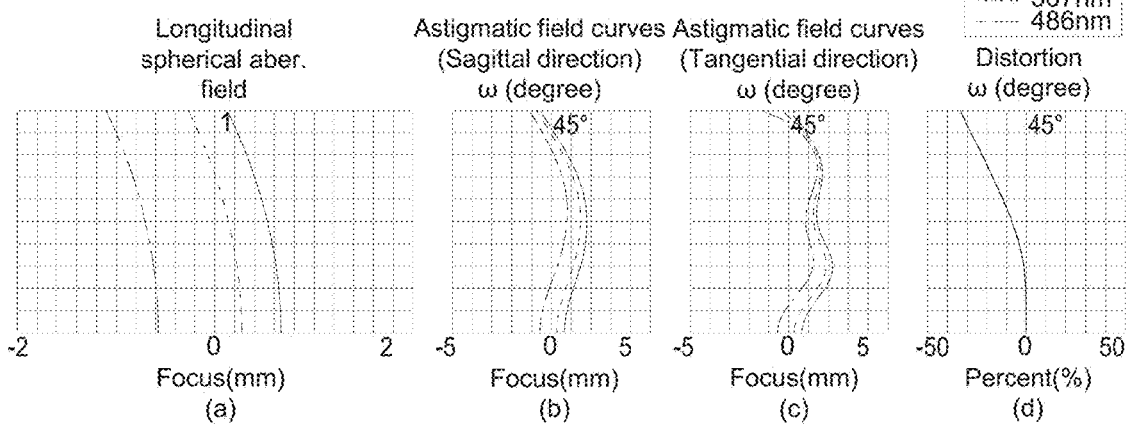
FIG. 20 depicts a chart of longitudinal spherical aberration and other kinds of optical aberrations of a fourth embodiment of the ocular optical system according the present disclosure.

Reference is now made to FIGS. 19-22. FIG. 19 illustrates an example cross-sectional view of an ocular optical system 4 having four lens elements of the ocular optical system according to a fourth example embodiment. FIG. 20 shows example charts of longitudinal spherical aberration and other kinds of optical aberrations of the ocular optical system 4 according to the fourth embodiment. FIG. 21 shows an example table of optical data of each lens element of the ocular optical system 4 according to the fourth example embodiment. FIG. 22 shows an example table of aspherical data of the ocular optical system 4 according to the fourth example embodiment. The reference numbers labeled in the present embodiment are similar to those in the first embodiment for the similar elements, but here the reference numbers are initialed with 4, for example, reference number 431 for labeling the eye-side surface of the third lens element 430, reference number 432 for labeling the display-side surface of the third lens element 430, etc.

As shown in FIG. 19, the ocular optical system 4 of the present embodiment, in an order from an eye side A1 facing to a pupil of an observer 400 to a display side A2 facing to a display plane 450 along an optical axis, may comprise a first lens element 410, a second lens element 420, a third lens element 430 and a fourth lens element 440.

The differences between the fourth embodiment and the first embodiment may include the radius of curvature and thickness of each lens element, the distance of each air gap, aspherical data, related optical parameters, such as back focal length, as shown in FIGS. 21 and 22, and the configuration of the concave/convex shape of the eye-side surfaces 411, 431 and the display-side surface 432; but the configuration of the concave/convex shape of surfaces, comprising the eye-side surfaces 421, 441 facing to the eye side A1 and the display-side surfaces 412, 422, 442 facing to the display side A2, are similar to those in the first embodiment. Specifically, the eye-side surface 411 of the first lens element 410 may comprise a concave surface comprising a concave portion 4111 in a vicinity of the optical axis and a concave portion 4112 in a vicinity of a periphery of the first lens element 410; the eye-side surface 431 of the third lens element 430 may comprise a concave portion 4311 in a vicinity of the optical axis; and the display-side surface 432 of the third lens element 430 may comprise a convex surface comprising a convex portion 4321 in a vicinity of the optical axis and a convex portion 4322 in a vicinity of a periphery of the third lens element 430. Please refer to FIG. 21 for the optical data of each lens elements in the ocular optical system 4 of the present embodiment, and please refer to FIG. 51 for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/

T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 20(a), the offset of the off-axis light relative to the image point may be within about ±1.2 mm. As the astigmatism aberration in the sagittal direction shown in FIG. 20(b), the focus variation with respect to the three wavelengths in the whole field may fall within about ±2 mm. As the astigmatism aberration in the tangential direction shown in FIG. 20(c), the focus variation with respect to the three wavelengths in the whole field may fall within about ±3 mm. As shown in FIG. 20(d), the variation of the distortion aberration may be within about ±35%.

Compared with the first embodiment, the astigmatism aberration in the tangential direction and the distortion aberration of the ocular optical system 4 may be less. According to the value of the aberrations, it is shown that the ocular optical system 4 of the present embodiment, with the length as short as about 73.670 mm and ω as large as about 45 degrees, may be capable of providing good imaging quality as well as good optical characteristics.

Figure 23:
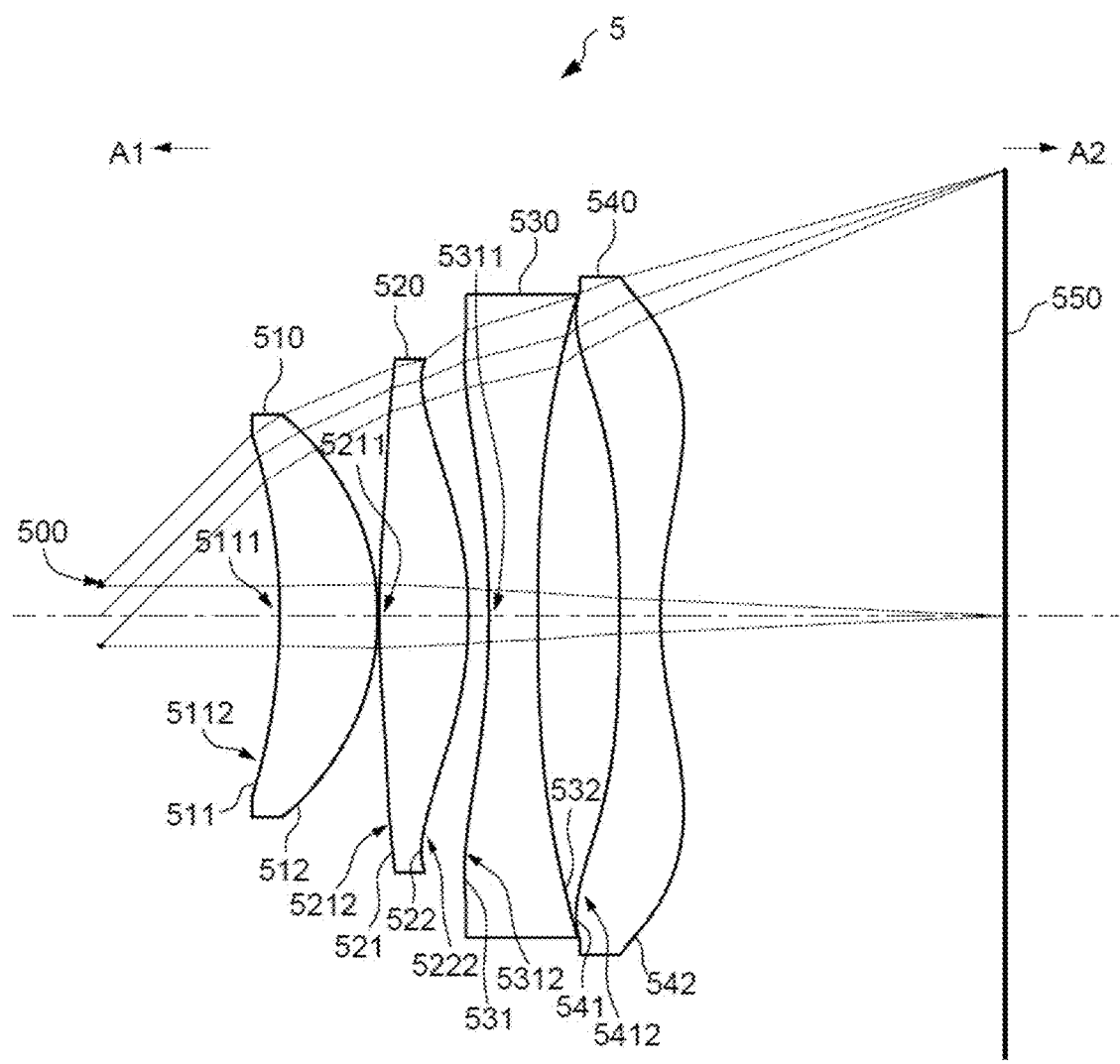
FIG. 23 depicts a cross-sectional view of a fifth embodiment of an ocular optical system having six lens elements according to the present disclosure.
Figure 24:
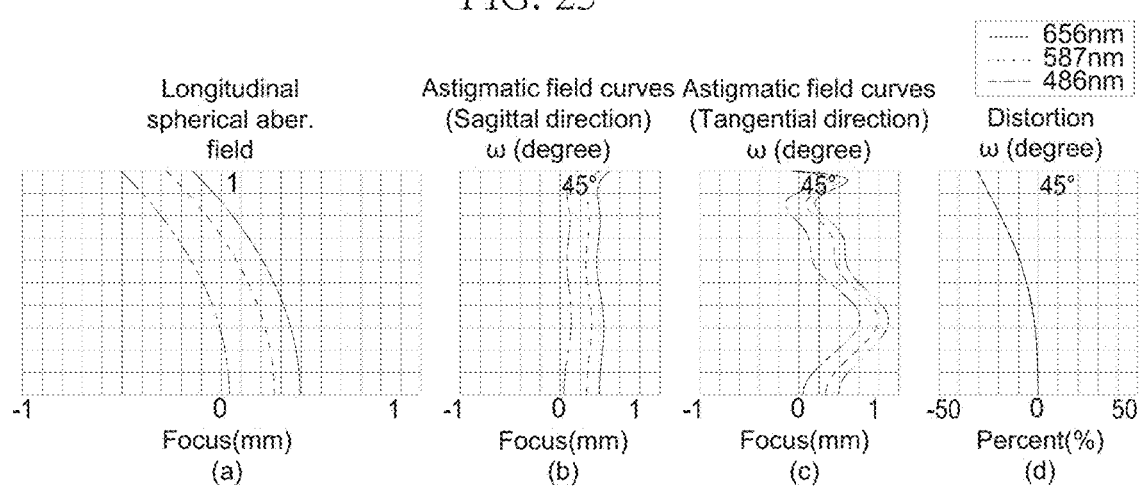
FIG. 24 depicts a chart of longitudinal spherical aberration and other kinds of optical aberrations of a fifth embodiment of the ocular optical system according the present disclosure.

Reference is now made to FIGS. 23-26. FIG. 23 illustrates an example cross-sectional view of an ocular optical system 5 having four lens elements of the ocular optical system 5 according to a fifth example embodiment. FIG. 24 shows example charts of longitudinal spherical aberration and other kinds of optical aberrations of the ocular optical system 5 according to the fifth embodiment. FIG. 25 shows an example table of optical data of each lens element of the ocular optical system 5 according to the fifth example embodiment. FIG. 26 shows an example table of aspherical data of the ocular optical system 5 according to the fifth example embodiment. The reference numbers labeled in the present embodiment are similar to those in the first embodiment for the similar elements, but here the reference numbers are initialed with 5, for example, reference number 531 for labeling the eye-side surface of the third lens element 530, reference number 532 for labeling the display-side surface of the third lens element 530, etc.

As shown in FIG. 23, the ocular optical system 5 of the present embodiment, in an order from an eye side A1 facing to a pupil of an observer 500 to a display side A2 facing to a display plane 550 along an optical axis, may comprise a first lens element 510, a second lens element 520, a third lens element 530, a fourth lens element 540.

The differences between the fifth embodiment and the first embodiment may include the radius of curvature and thickness of each lens element, the distance of each air gap, aspherical data, related optical parameters, such as back focal length, as shown in FIGS. 25 and 26, and the configuration of the concave/convex shape of the eye-side surfaces 511, 521, 531, 541, and the display-side surface 522; but the configuration of the concave/convex shape of the display-side surfaces 512, 532, 542 facing to the display side A2, are similar to those in the first embodiment. Specifically, the eye-side surface 511 of the first lens element 510 may be a concave surface comprising a concave portion 5111 in a vicinity of the optical axis and a concave portion 5112 in a vicinity of a periphery of the first lens element 510; the eye-side surface 521 of the second lens element 520 may be a convex surface comprising a convex portion 5211 in a vicinity of the optical axis and a convex portion 5212 in a vicinity of a periphery of the second lens element 520; the display-side surface 522 of the second lens element 520 may comprise a concave portion 5222 in a vicinity of the periphery of the second lens element 520; the eye-side surface 531 of the third lens element 530 may comprise a concave portion 5311 in a vicinity of the optical axis and a convex portion 5312 in a vicinity of a periphery of the third lens element 530; the eye-side surface 541 of the fourth lens element 530 comprises a convex portion 5412 in a vicinity of a periphery of the fourth lens element 540. Please refer to FIG. 25 for the optical data of each lens elements in the ocular optical system 5 of the present embodiment, and please refer to FIG. 51 for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 24(a), the offset of the off-axis light relative to the image point may be within about ±0.6 mm. As the astigmatism aberration in the sagittal direction shown in FIG. 24(b), the focus variation with respect to the three wavelengths in the whole field may fall within about ±0.6 mm. As the astigmatism aberration in the tangential direction shown in FIG. 24(c), the focus variation with respect to the three wavelengths in the whole field may fall within about ±1 mm. As shown in FIG. 24(d), the variation of the distortion aberration may be within about ±35%.

Compared with the first embodiment, the astigmatism aberrations both in the sagittal and tangential directions and the distortion aberration of the ocular optical system 5 may be less, and the system length of the ocular optical system 5 may be shorter. According to the value of the aberrations, it is shown that the ocular optical system 5 of the present embodiment, with the length as short as about 48.560 mm and ω as large as about 45 degrees, may be capable of providing good imaging quality as well as good optical characteristics.

Figure 27:
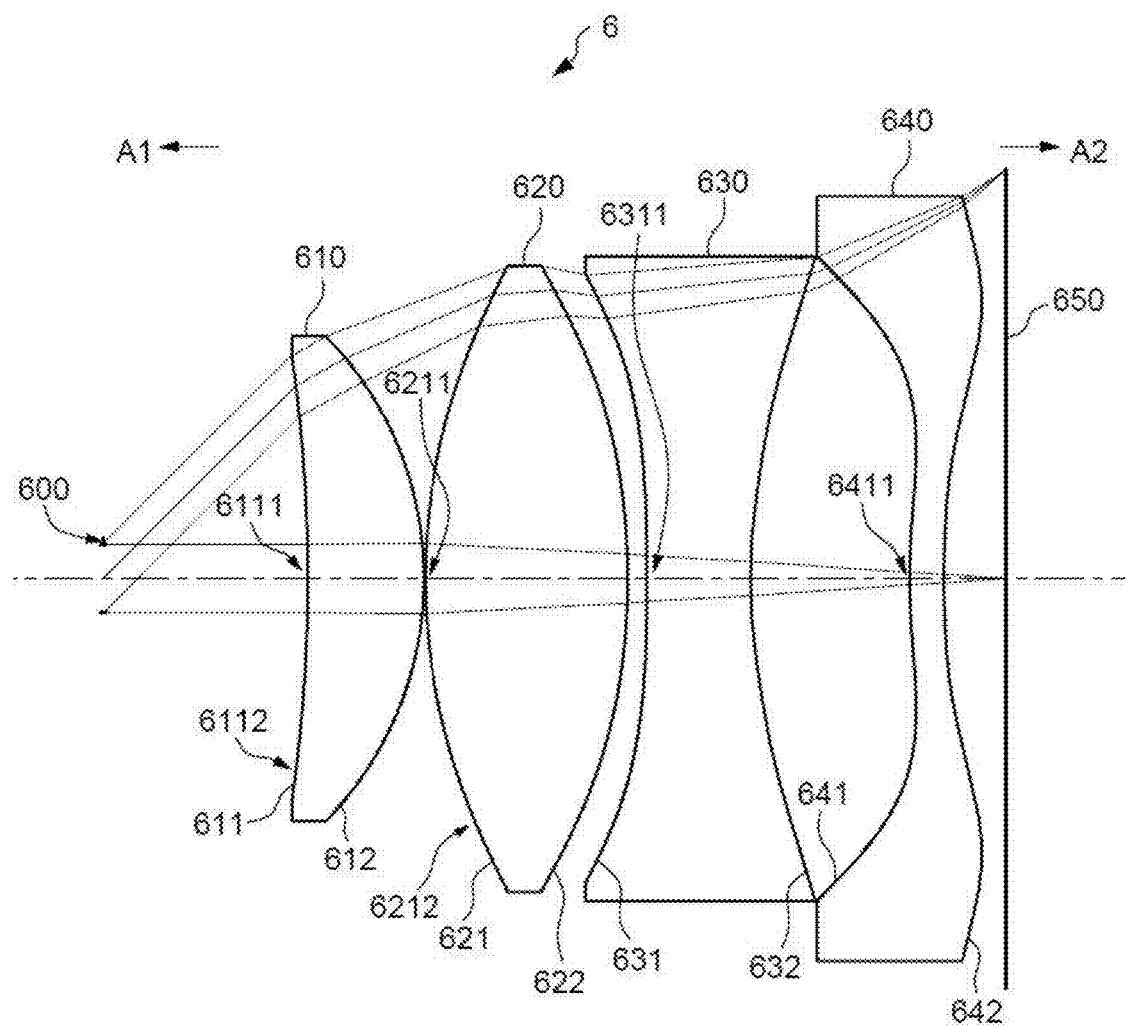
FIG. 27 depicts a cross-sectional view of a sixth embodiment of an ocular optical system having six lens elements according to the present disclosure.
Figure 28:
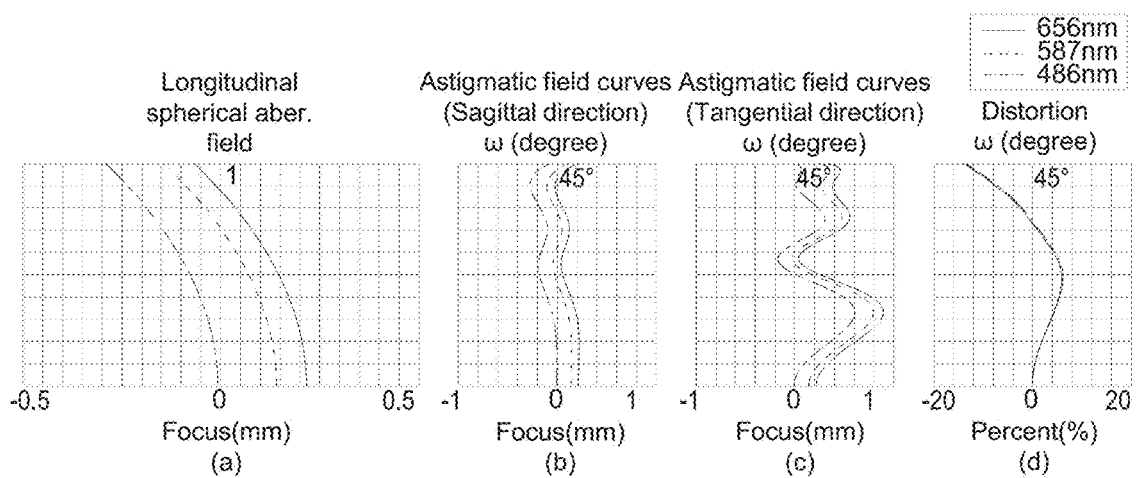
FIG. 28 depicts a chart of longitudinal spherical aberration and other kinds of optical aberrations of a sixth embodiment of the ocular optical system according to the present disclosure.

Reference is now made to FIGS. 27-30. FIG. 27 illustrates an example cross-sectional view of an ocular optical system 6 having four lens elements of the ocular optical system according to a sixth example embodiment. FIG. 28 shows example charts of longitudinal spherical aberration and other kinds of optical aberrations of the ocular optical system 6 according to the sixth embodiment. FIG. 29 shows an example table of optical data of each lens element of the ocular optical system 6 according to the sixth example embodiment. FIG. 30 shows an example table of aspherical data of the ocular optical system 6 according to the sixth example embodiment. The reference numbers labeled in the present embodiment are similar to those in the first embodiment for the similar elements, but here the reference numbers are initialed with 6, for example, reference number 631 for labeling the eye-side surface of the third lens element 630, reference number 632 for labeling the display-side surface of the third lens element 630, etc.

As shown in FIG. 27, the ocular optical system 6 of the present embodiment, in an order from an eye side A1 facing to a pupil of an observer 600 to a display side A2 facing to a display plane 650 along an optical axis, may comprise a first lens element 610, a second lens element 620, a third lens element 630 and a fourth lens element 640.

The differences between the sixth embodiment and the first embodiment may include the radius of curvature and thickness of each lens element, the distance of each air gap, aspherical data, related optical parameters, such as back focal length, as shown in FIGS. 29 and 30, and the configuration of the concave/convex shape of the eye-side surfaces 611, 621, 631, 641; but the configuration of the concave/convex shape of the display-side surfaces 612, 622, 632, 642, facing to the display side A2, are similar to those in the first embodiment, and the fourth lens element 640 may have positive refracting power. Specifically, the eye-side surface 611 of the first lens element 610 may comprise a concave surface comprising a concave portion 6111 in a vicinity of the optical axis and a concave portion 6112 in a vicinity of a periphery of the first lens element 610; the eye-side surface 621 of the second lens element 620 may comprise a convex surface comprising a convex portion 6211 in a vicinity of the optical axis and a convex portion 6212 in a vicinity of a periphery of the second lens element 620; the eye-side surface 631 of the third lens element 630 may comprise a concave portion 6311 in a vicinity of the optical axis; the eye-side surface 641 of the fourth lens element 640 may comprise a convex portion 6411 in a vicinity of the optical axis. Please refer to FIG. 29 for the optical data of each lens elements in the ocular optical system 6 of the present embodiment, please refer to FIG. 51 for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 28(*a*), the offset of the off-axis light relative to the image point may be within about ±0.3 mm. As the astigmatism aberration in the sagittal direction shown in FIG. 28(*b*), the focus variation with respect to the three wavelengths in the whole field may fall within about ±0.4 mm. As the astigmatism aberration in the tangential direction shown in FIG. 28(*c*), the focus variation with respect to the three wavelengths in the whole field may fall within about ±1 mm. As shown in FIG. 28(*d*), the variation of the distortion aberration may be within about ±16%.

Compared with the first embodiment, the longitudinal spherical aberration, astigmatism aberrations both in the sagittal and tangential directions and the distortion aberration of the ocular optical system 6 may be less, and the system length of the ocular optical system 6 may be shorter. According to the value of the aberrations, it is shown that the ocular optical system 6 of the present embodiment, with the length as short as about 40.863 mm and ω as large as about 45 degrees, may be capable of providing good imaging quality as well as good optical characteristics.

Figure 31:
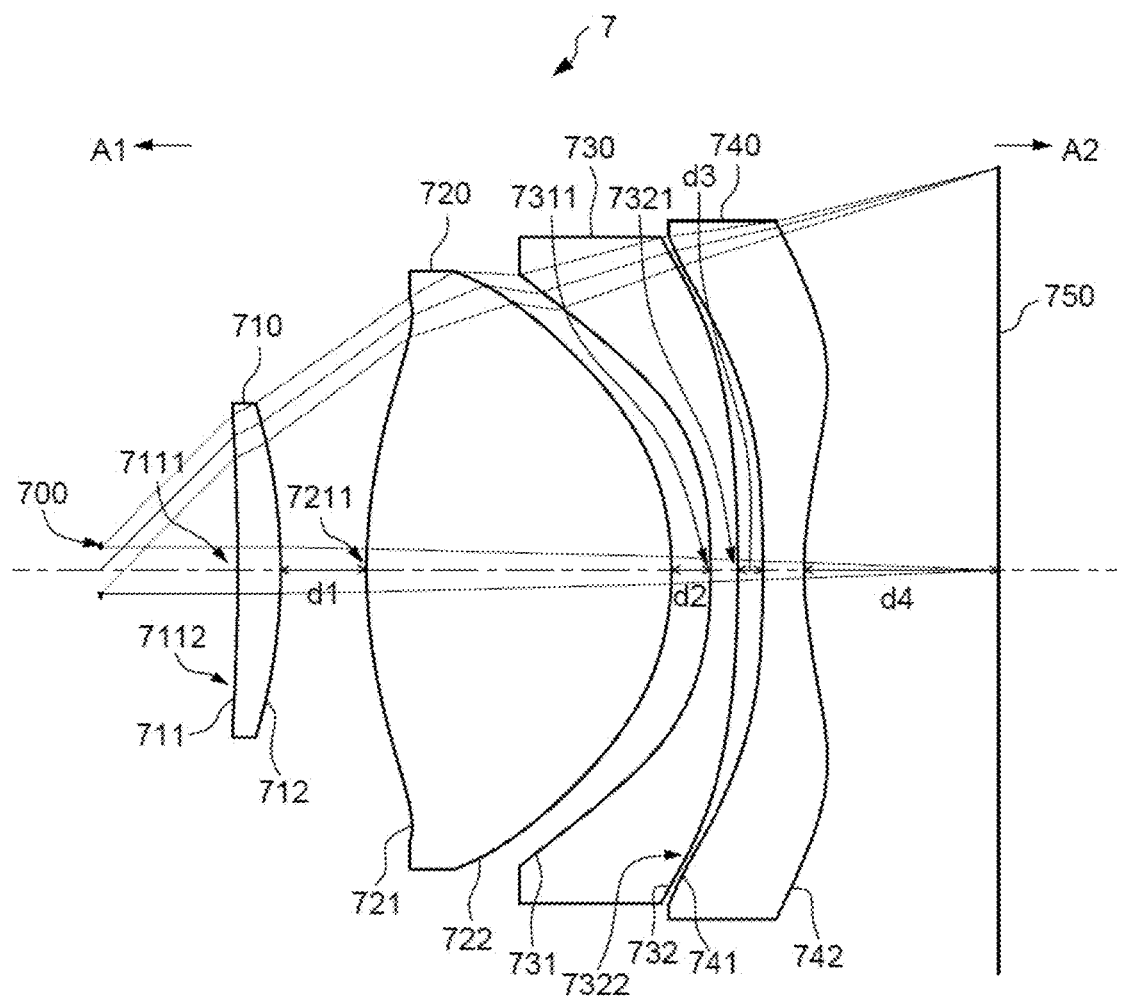
FIG. 31 depicts a cross-sectional view of a seventh embodiment of an ocular optical system having six lens elements according to the present disclosure.
Figure 32:
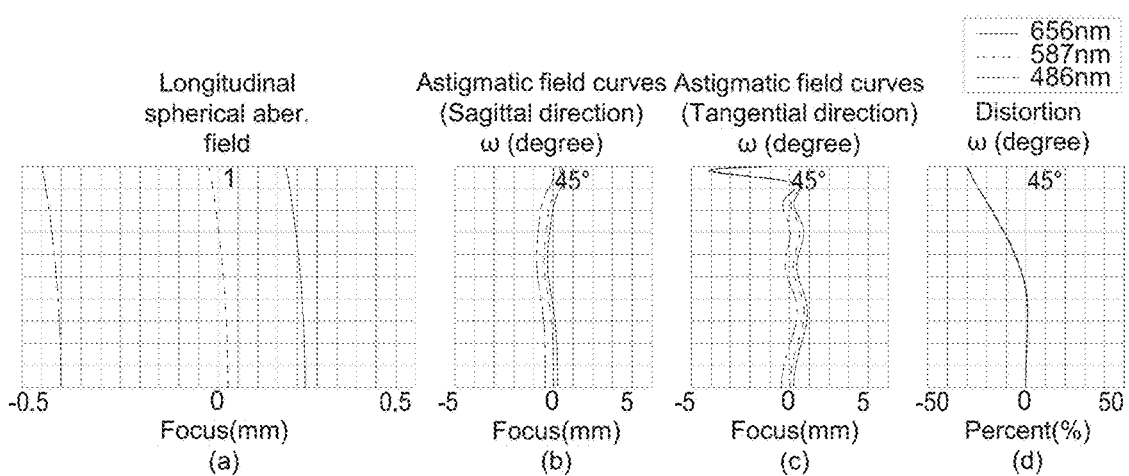
FIG. 32 depicts a chart of longitudinal spherical aberration and other kinds of optical aberrations of a seventh embodiment of the ocular optical system according to the present disclosure.

Reference is now made to FIGS. 31-34. FIG. 31 illustrates an example cross-sectional view of an ocular optical system 7 having four lens elements of the ocular optical system according to a seventh example embodiment. FIG. 32 shows example charts of longitudinal spherical aberration and other kinds of optical aberrations of the ocular optical system 7 according to the seventh embodiment. FIG. 33 shows an example table of optical data of each lens element of the ocular optical system 7 according to the seventh example embodiment. FIG. 34 shows an example table of aspherical data of the ocular optical system 7 according to the seventh example embodiment. The reference numbers labeled in the present embodiment are similar to those in the first embodiment for the similar elements, but here the reference numbers are initialed with 7, for example, reference number 731 for labeling the eye-side surface of the third lens element 730, reference number 732 for labeling the display-side surface of the third lens element 730, etc.

As shown in FIG. 31, the ocular optical system 7 of the present embodiment, in an order from an eye side A1 facing to a pupil of an observer 700 to a display side A2 facing to a display plane 750 along an optical axis, may comprise a first lens element 710, a second lens element 720, a third lens element 730 and a fourth lens element 740.

The differences between the seventh embodiment and the first embodiment may include the radius of curvature and thickness of each lens element, the distance of each air gap, aspherical data, related optical parameters, such as back focal length, as shown in FIGS. 33 and 34, and the configuration of the concave/convex shape of surfaces, comprising the eye-side surfaces 711, 721, 731 and the display-side surface 732; but the configuration of the concave/convex shape of surfaces, comprising the eye-side surface 741 facing to the eye side A1 and the display-side surfaces 712, 722, 742 facing to the display side A2, are similar to those in the first embodiment. Specifically, the eye-side surface 711 of the first lens element 710 may comprise a concave surface comprising a concave portion 7111 in a vicinity of the optical axis and a concave portion 7112 in a vicinity of a periphery of the first lens element 710; the eye-side surface 721 of the second lens element 720 may comprise a convex portion 7211 in a vicinity of the optical axis; the eye-side surface 731 of the third lens element 730 may comprise a concave portion 7311 in a vicinity of the optical axis; and the display-side surface 732 of the third lens element 730 may comprise a convex surface comprising a convex portion 7321 in a vicinity of the optical axis and a convex portion 7322 in a vicinity of a periphery of the third lens element 730. Please refer to FIG. 33 for the optical data of each lens elements in the ocular optical system 7 of the present embodiment, please refer to FIG. 51A for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 32(*a*), the offset of the off-axis light relative to the image point may be within about ±0.5 mm. As the astigmatism aberration in the sagittal direction shown in FIG. 32(*b*), the focus variation with respect to the three wavelengths in the whole field may fall within about ±1 mm. As the astigmatism aberration in the tangential direction shown in FIG. 32(*c*), the focus variation with respect to the three wavelengths in the whole field may fall within about ±5 mm. As shown in FIG. 32(*d*), the variation of the distortion aberration may be within about ±35%.

Compared with the first embodiment, the astigmatism aberration in the tangential direction and the distortion aberration of the ocular optical system 7 may be less, and the system length of the ocular optical system 7 may be shorter. According to the value of the aberrations, it is shown that the ocular optical system 7 of the present embodiment, with the length as short as about 66.377 mm and ω as large as about 45 degrees, may be capable of providing good imaging quality as well as good optical characteristics.

Figure 35:
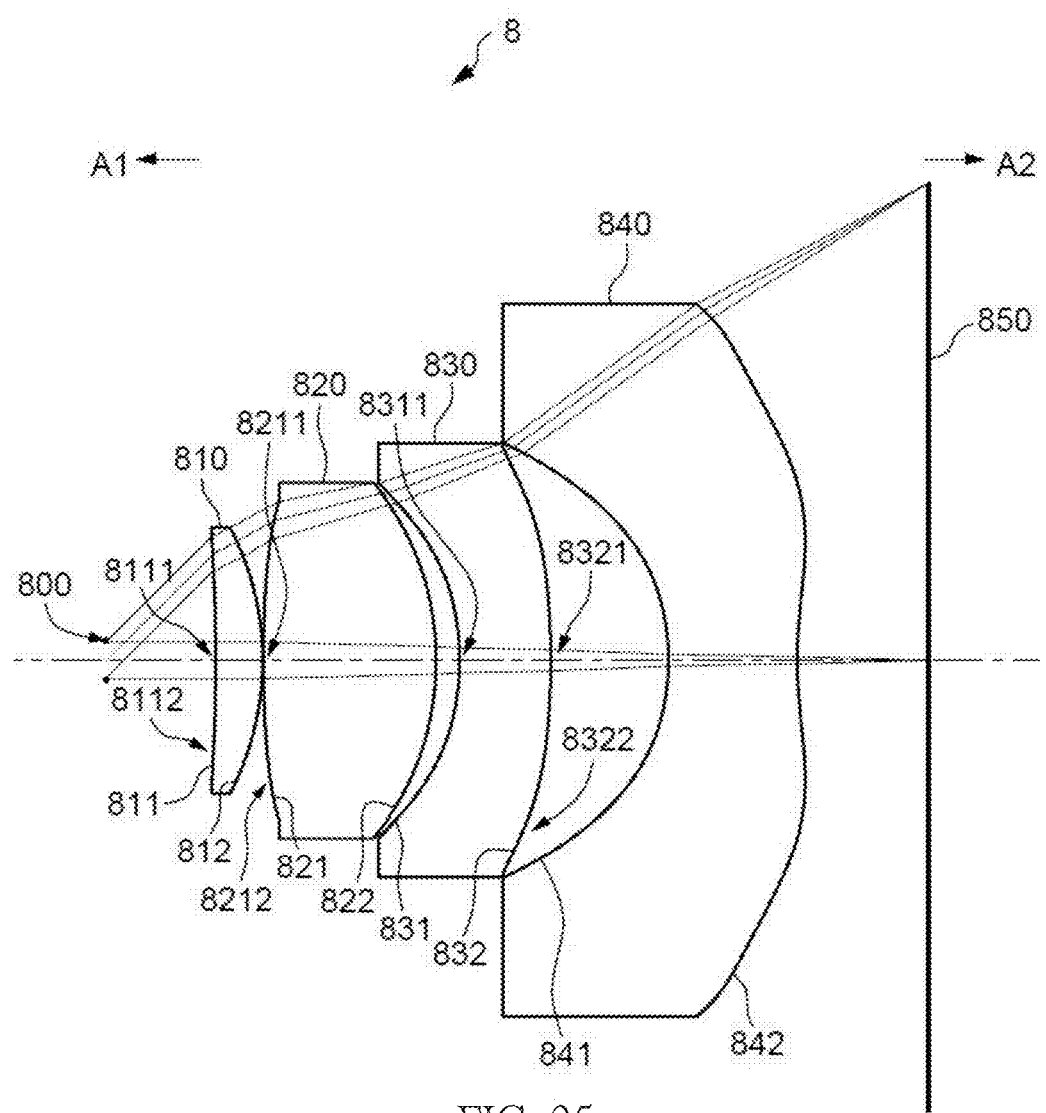
FIG. 35 depicts a cross-sectional view of an eighth embodiment of an ocular optical system having six lens elements according to the present disclosure.
Figure 36:
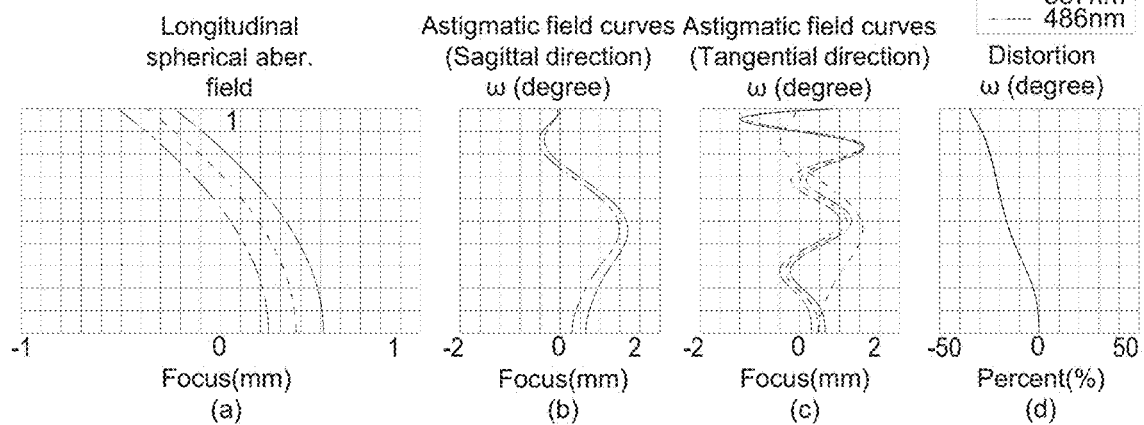
FIG. 36 depicts a chart of longitudinal spherical aberration and other kinds of optical aberrations of an eighth embodiment of the ocular optical system according to the present disclosure.

Reference is now made to FIGS. 35-38. FIG. 35 illustrates an example cross-sectional view of an ocular optical system 8 having four lens elements of the ocular optical system according to an eighth example embodiment. FIG. 36 shows example charts of longitudinal spherical aberration and other kinds of optical aberrations of the ocular optical system 8 according to the eighth embodiment. FIG. 37 shows an example table of optical data of each lens element of the ocular optical system 8 according to the eighth example embodiment. FIG. 38 shows an example table of aspherical data of the ocular optical system 8 according to the eighth example embodiment. The reference numbers labeled in the present embodiment are similar to those in the first embodiment for the similar elements, but here the reference numbers are initialed with 8, for example, reference number 831 for labeling the eye-side surface of the third lens element 830, reference number 832 for labeling the display-side surface of the third lens element 830, etc.

As shown in FIG. 35, the ocular optical system 8 of the present embodiment, in an order from an eye side A1 facing to a pupil of an observer 800 to a display side A2 facing to a display plane 850 along an optical axis, may comprise a first lens element 810, a second lens element 820, a third lens element 830 and a fourth lens element 840.

The differences between the eighth embodiment and the first embodiment may include the radius of curvature and thickness of each lens element, the distance of each air gap, aspherical data, related optical parameters, such as back focal length, as shown in FIGS. 37 and 38, and the configuration of the concave/convex shape of the eye-side surfaces 811, 821, 831 and the display-side surface 832; but the configuration of the concave/convex shape of surfaces, comprising the eye-side surface 841 facing to the eye side A1 and the display-side surfaces 812, 822, 842 facing to the display side A2, are similar to those in the first embodiment Specifically, the eye-side surface 811 of the first lens element 810 may comprise a concave surface comprising a concave portion 8111 in a vicinity of the optical axis and a concave portion 8112 in a vicinity of a periphery of the first lens element 810; the eye-side surface 821 of the second lens element 820 may comprise a convex surface comprising a convex portion 8211 in a vicinity of the optical axis and a convex portion 8212 in a vicinity of a periphery of the second lens element 820; the eye-side surface 831 of the third lens element 830 may comprise a concave portion 8311 in a vicinity of the optical axis; and the display-side surface 832 of the third lens element 830 may comprise a convex surface comprising a convex portion 8321 in a vicinity of the optical axis and a convex portion 8322 in a vicinity of a periphery of the third lens element 830. Please refer to FIG. 37 for the optical data of each lens elements in the ocular optical system 8 of the present embodiment, please refer to FIG. 51A for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 36(*a*), the offset of the off-axis light relative to the image point may be within about ±0.6 mm. As the astigmatism aberration in the sagittal direction shown in FIG. 36(*b*), the focus variation with respect to the three wavelengths in the whole field may fall within about ±1.6 mm. As the astigmatism aberration in the tangential direction shown in FIG. 36(*c*), the focus variation with respect to the three wavelengths in the whole field may fall within about ±1.6 mm. As shown in FIG. 36(*d*), the variation of the distortion aberration may be within about ±40%.

Compared with the first embodiment, the astigmatism aberration in the tangential direction of the ocular optical system 8 may be less. According to the value of the aberrations, it is shown that the ocular optical system 8 of the present embodiment, with the length as short as about 78.000 mm and ω as large as 45 degrees, may be capable to provide good imaging quality as well as good optical characteristics.

Figure 39:
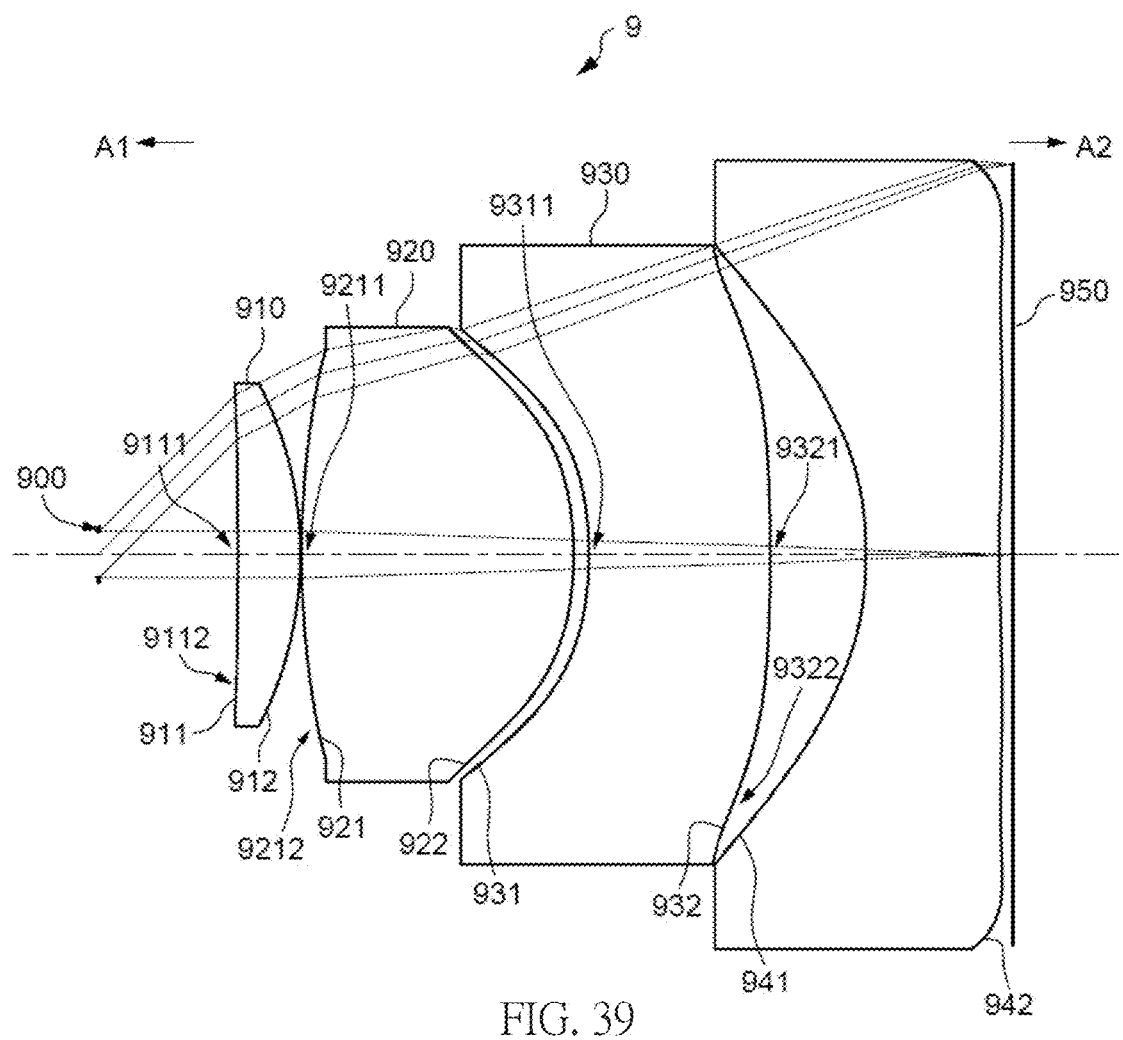
FIG. 39 depicts a cross-sectional view of a ninth embodiment of an ocular optical system having six lens elements according to the present disclosure.
Figure 40:
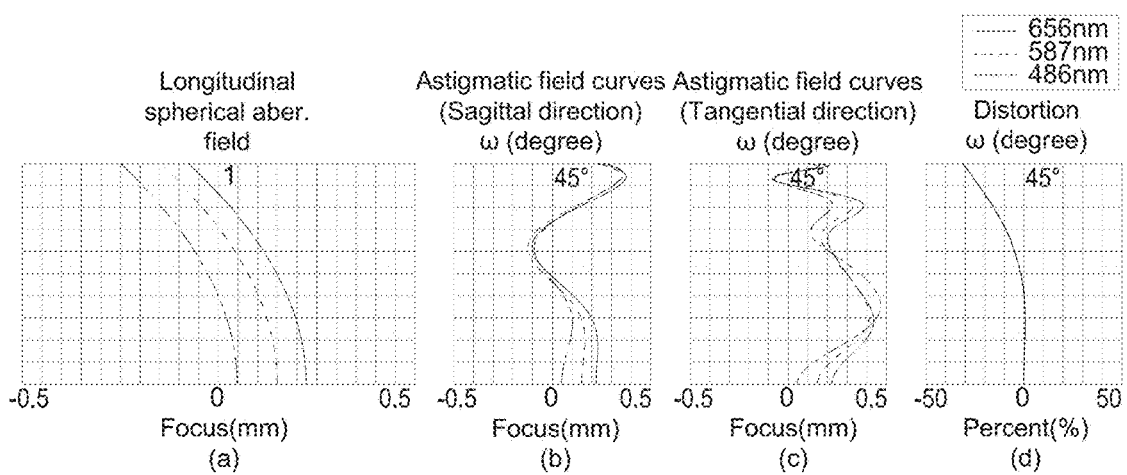
FIG. 40 depicts a chart of longitudinal spherical aberration and other kinds of optical aberrations of a ninth embodiment of the ocular optical system according to the present disclosure.

Reference is now made to FIGS. 39-42. FIG. 39 illustrates an example cross-sectional view of an ocular optical system 9 having four lens elements of the ocular optical system according to a ninth example embodiment. FIG. 40 shows example charts of longitudinal spherical aberration and other kinds of optical aberrations of the ocular optical system 9 according to the ninth embodiment. FIG. 41 shows an example table of optical data of each lens element of the ocular optical system 9 according to the ninth example embodiment. FIG. 42 shows an example table of aspherical data of the ocular optical system 9 according to the ninth example embodiment. The reference numbers labeled in the present embodiment are similar to those in the first embodiment for the similar elements, but here the reference numbers are initialed with 9, for example, reference number 931 for labeling the eye-side surface of the third lens element 930, reference number 932 for labeling the display-side surface of the third lens element 930, etc.

As shown in FIG. 39, the ocular optical system 9 of the present embodiment, in an order from an eye side A1 facing to a pupil of an observer 900 to a display side A2 facing to a display plane 950 along an optical axis, may comprise first lens element 910, a second lens element 920, a third lens element 930 and a fourth lens element 940.

The differences between the ninth embodiment and the first embodiment may include the radius of curvature and thickness of each lens element, the distance of each air gap, aspherical data, related optical parameters, such as back focal length, as shown in FIGS. 41 and 42, and the configuration of the concave/convex shape of the eye-side surfaces 911, 921, 931 and the display-side surface 932; but the configuration of the concave/convex shape of surfaces, comprising the eye-side surface 941 facing to the eye side A1 and the display-side surfaces 912, 922, 942 facing to the display side A2, are similar to those in the first embodiment. Specifically, the eye-side surface 911 of the first lens element 910 may comprise a concave surface comprising a concave portion 9111 in a vicinity of the optical axis and a concave portion 9112 in a vicinity of a periphery of the first lens element 910; the eye-side surface 921 of the second lens element 920 may comprise a convex surface comprising a convex portion 9211 in a vicinity of the optical axis and a convex portion 9212 in a vicinity of a periphery of the second lens element 920; the eye-side surface 931 of the third lens element 930 may comprise a concave portion 9311 in a vicinity of the optical axis; and the display-side surface 932 of the third lens element 930 may comprise a convex surface comprising a convex portion 9321 in a vicinity of the optical axis and a convex portion 9322 in a vicinity of a periphery of the third lens element 930. Please refer to FIG. 41 for the optical data of each lens elements in the ocular optical system 9 of the present embodiment, please refer to FIG. 51A for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 40(a), the offset of the off-axis light relative to the image point may be within about ±0.3 mm. As the astigmatism aberration in the sagittal direction shown in FIG. 40(b), the focus variation with respect to the three wavelengths in the whole field may fall within about ±0.4 mm. As the astigmatism aberration in the tangential direction shown in FIG. 40(c), the focus variation with respect to the three wavelengths in the whole field may fall within about ±0.5 mm. As shown in FIG. 40(d), the variation of the distortion aberration may be within about ±35%.

Compared with the first embodiment, the astigmatism aberrations both in the sagittal and tangential directions and the distortion aberration of the ocular optical system 9 may be less. According to the value of the aberrations, it is shown that the ocular optical system 9 of the present embodiment, with the length as short as about 68.706 mm and ω as large as 45 degrees, may be capable to provide good imaging quality as well as good optical characteristics.

Figure 43:
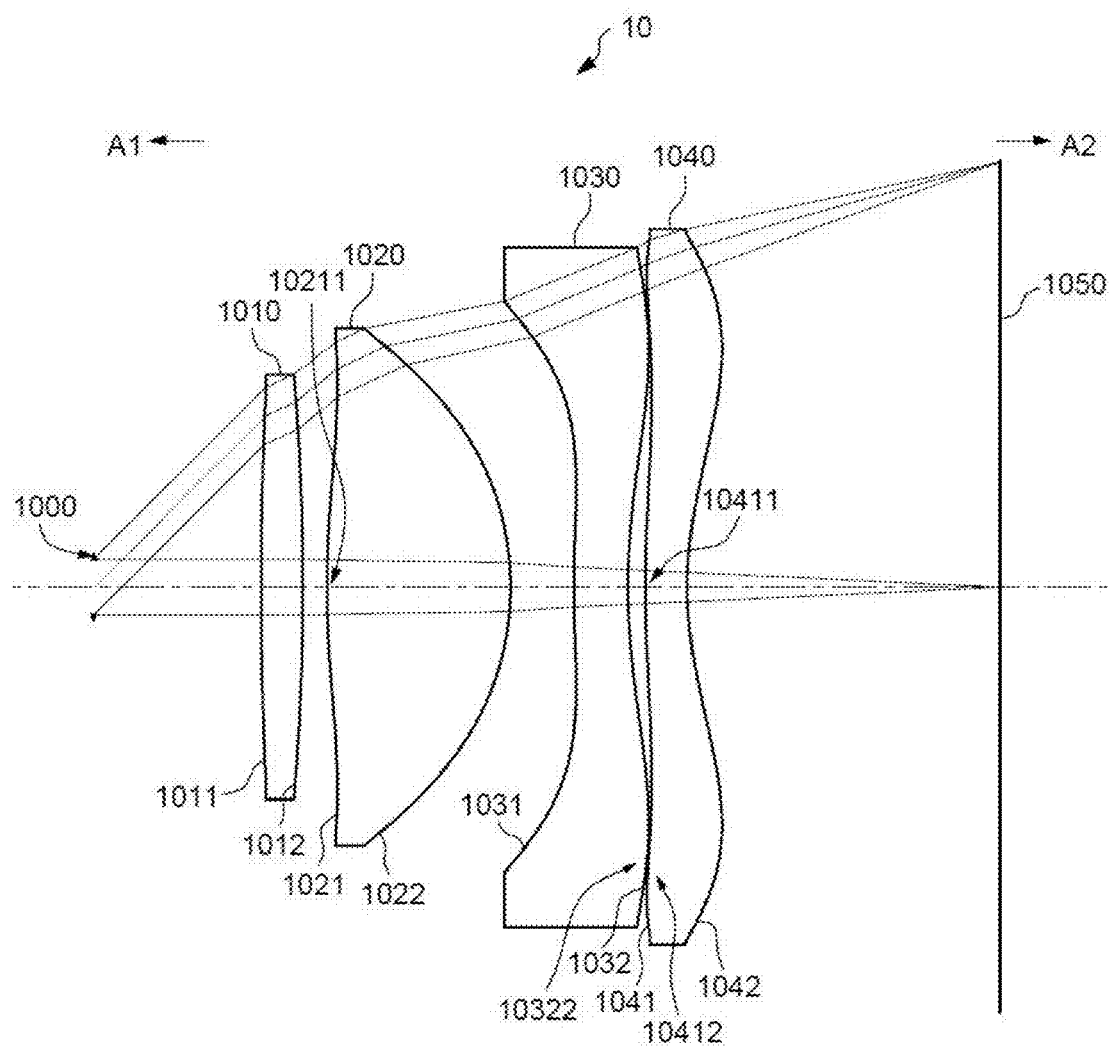
FIG. 43 depicts a cross-sectional view of a tenth embodiment of an ocular optical system having six lens elements according to the present disclosure.
Figure 44:
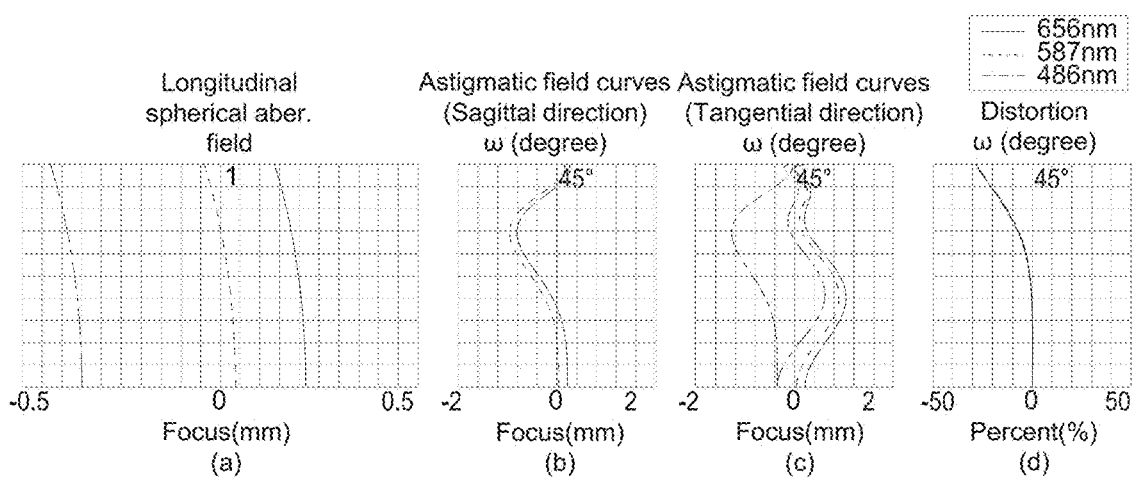
FIG. 44 depicts a chart of longitudinal spherical aberration and other kinds of optical aberrations of a tenth embodiment of the ocular optical system according to the present disclosure.

Reference is now made to FIGS. 43-46. FIG. 43 illustrates an example cross-sectional view of an ocular optical system 10 having four lens elements of the ocular optical system according to a tenth example embodiment. FIG. 44 shows example charts of longitudinal spherical aberration and other kinds of optical aberrations of the ocular optical system 10 according to the tenth embodiment. FIG. 45 shows an example table of optical data of each lens element of the ocular optical system 10 according to the tenth example embodiment. FIG. 46 shows an example table of aspherical data of the ocular optical system 10 according to the tenth example embodiment. The reference numbers labeled in the present embodiment are similar to those in the first embodiment for the similar elements, but here the reference numbers are initialed with 10, for example, reference number 1031 for labeling the eye-side surface of the third lens element 1030, reference number 1032 for labeling the display-side surface of the third lens element 1030, etc.

As shown in FIG. 43, the ocular optical system 10 of the present embodiment, in an order from an eye side A1 facing to a pupil of an observer 1000 to a display side A2 facing to a display plane 1050 along an optical axis, may comprise a first lens element 1010, a second lens element 1020, a third lens element 1030 and a fourth lens element 1040.

The differences between the tenth embodiment and the first embodiment may include the radius of curvature and thickness of each lens element, the distance of each air gap, aspherical data, related optical parameters, such as back focal length, as shown in FIGS. 45 and 46, and the configuration of the concave/convex shape of the eye-side surfaces 1021, 1041 and the display-side surface 1032; but the configuration of the concave/convex shape of surfaces, comprising the eye-side surface 1011, 1031 facing to the eye side A1 and the display-side surfaces 1012, 1022, 1042 facing to the display side A2, are similar to those in the first embodiment. Specifically, the eye-side surface 1021 of the second lens element 1020 may comprise a convex portion 10211 in a vicinity of the optical axis; the display-side surface 1032 of the third lens element 1030 may comprise a convex portion 10322 in a vicinity of a periphery of the third lens element 1030; and the eye-side surface 1041 of the fourth lens element 1010 may comprise a convex portion 10411 in a vicinity of the optical axis and a convex portion 10412 in a vicinity of a periphery of the fourth lens element 1040. Please refer to FIG. 45 for the optical data of each lens elements in the ocular optical system 10 of the present embodiment, please refer to FIG. 51A for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 44(a), the offset of the off-axis light relative to the display point may be within about ±0.5 mm. As the astigmatism aberration in the sagittal direction shown in FIG. 44(b), the focus variation with respect to the three wavelengths in the whole field may fall within about ±1.2 mm. As the astigmatism aberration in the tangential direction shown in FIG. 44(c), the focus variation with respect to the three wavelengths in the whole field may fall within about ±1.6 mm. As shown in FIG. 44(d), the variation of the distortion aberration may be within about ±30%.

Compared with the first embodiment, the astigmatism aberration in the tangential direction and the distortion aberration of the ocular optical system 10 may be less, and the system length of the ocular optical system 10 may be shorter. According to the value of the aberrations, it is shown that the ocular optical system 10 of the present embodiment, with the length as short as about 53.034 mm and ω as large as 77.95 degrees, may be capable to provide good imaging quality as well as good optical characteristics.

Figure 47:
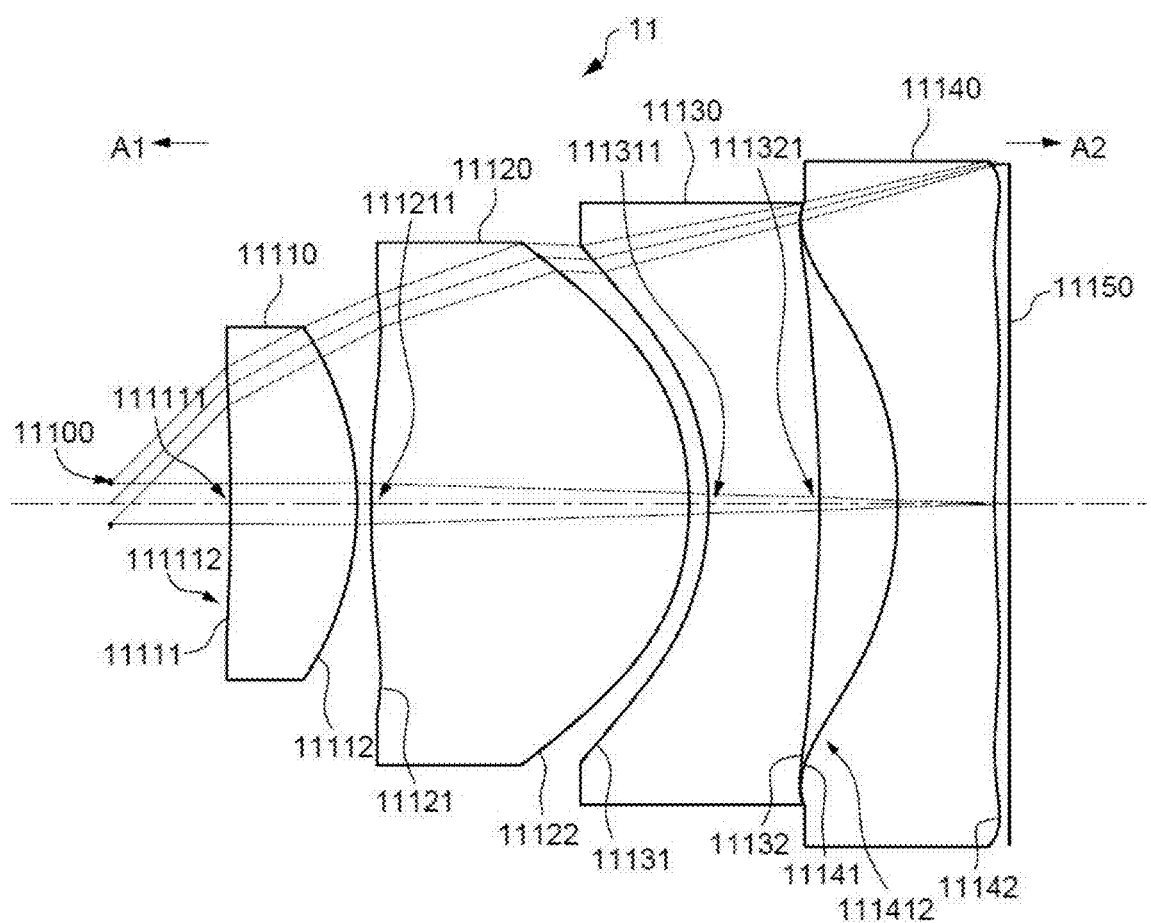
FIG. 47 depicts a cross-sectional view of a eleventh embodiment of an ocular optical system having six lens elements according to the present disclosure.
Figure 48:
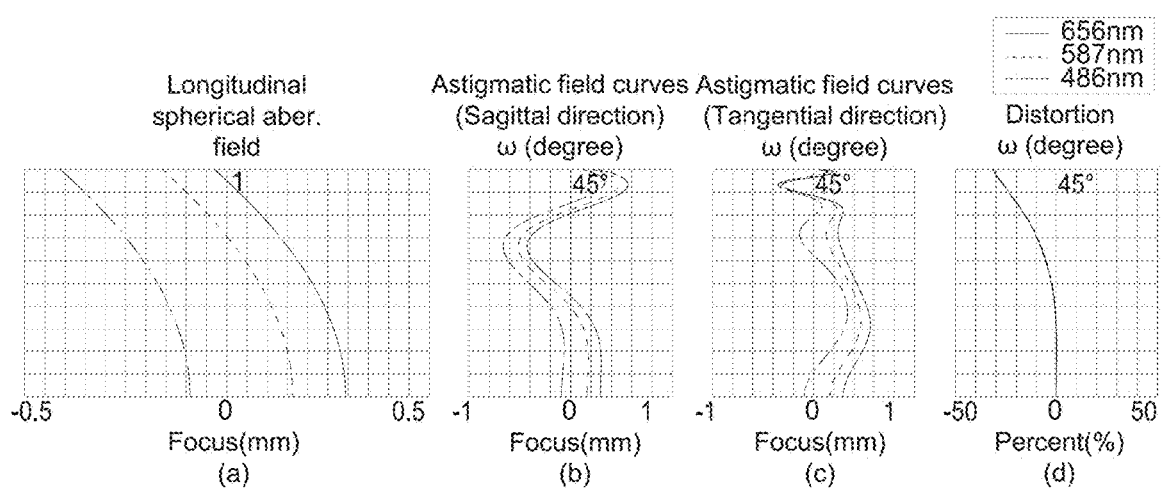
FIG. 48 depicts a chart of longitudinal spherical aberration and other kinds of optical aberrations of a eleventh embodiment of the ocular optical system according to the present disclosure.

Reference is now made to FIGS. 47-50. FIG. 47 illustrates an example cross-sectional view of an ocular optical system 11 having four lens elements of the ocular optical system according to an eleventh example embodiment. FIG. 48 shows example charts of longitudinal spherical aberration and other kinds of optical aberrations of the ocular optical system 11 according to the eleventh embodiment. FIG. 49 shows an example table of optical data of each lens element of the ocular optical system 11 according to the eleventh example embodiment. FIG. 50 shows an example table of aspherical data of the ocular optical system 11 according to the eleventh example embodiment. The reference numbers labeled in the present embodiment are similar to those in the first embodiment for the similar elements, but here the reference numbers are initialed with 111, for example, reference number 11131 for labeling the eye-side surface of the third lens element 11130, reference number 11132 for labeling the display-side surface of the third lens element 11130, etc.

As shown in FIG. 47, the ocular optical system 11 of the present embodiment, in an order from an eye side A1 facing to a pupil of an observer 11100 to a display side A2 facing to a display plane 11150 along an optical axis, may comprise a first lens element 11110, a second lens element 11120, a third lens element 11130 and a fourth lens element 11140.

The differences between the eleventh embodiment and the first embodiment may include the radius of curvature and thickness of each lens element, the distance of each air gap, aspherical data, related optical parameters, such as back focal length, as shown in FIGS. 49 and 50, and the configuration of the concave/convex shape of the eye-side surfaces 11111, 11121, 11131, 11141 and the display-side surface 11132; but the configuration of the concave/convex shape of surfaces, comprising the display-side surfaces 11112, 11122, 11142 facing to the display side A2, are similar to those in the first embodiment. Specifically, the eye-side surface 11111 of the first lens element 11110 may comprise a concave surface comprising a concave portion 11111 in a vicinity of the optical axis and a concave portion 11112 in a vicinity of a periphery of the first lens element 11110; the eye-side surface 11121 of the second lens element 11120 may comprise a convex portion 11211 in a vicinity of the optical axis; the eye-side surface 11131 of the third lens element 1130 may comprise a concave portion 11311 in a vicinity of the optical axis; the display-side surface 11132 of the third lens element 11130 may comprise a convex portion 11321 in a vicinity of the optical axis; and the eye-side surface 11141 of the fourth lens element 11140 may comprise a convex portion 11412 in a vicinity of a periphery of the fourth lens element 11140. Please refer to FIG. 49 for the optical characteristics of each lens elements in the ocular optical system 11 of the present embodiment, please refer to FIG. 51A for the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of the present embodiment.

As the longitudinal spherical aberration shown in FIG. 48(a), the offset of the off-axis light relative to the image point may be within about ±0.5 mm. As the astigmatism aberration in the sagittal direction shown in FIG. 48(b), the focus variation with respect to the three wavelengths in the whole field may fall within about ±0.8 mm. As the astigmatism aberration in the tangential direction shown in FIG. 48(c), the focus variation with respect to the three wavelengths in the whole field may fall within about ±0.6 mm. As shown in FIG. 48(d), the variation of the distortion aberration may be within about ±35%.

Compared with the first embodiment, the astigmatism aberrations both in the sagittal and tangential directions and the distortion aberration of the ocular optical system 11 may be less. According to the value of the aberrations, it is shown that the ocular optical system 11 of the present embodiment, with the length as short as about 77.650 mm and ω as large as about 45 degrees, may be capable to provide good imaging quality as well as good optical characteristics.

Please refer to FIGS. 51 and 51A, which show the values of T1, T1, G12, T2, G23, T3, G34, T4, G4D, ALT, AAG, TTL, SL, G4D/AAG, 250/EFL, (AAG+G4D)/(G23+G34), (AAG+G4D)/(T1+T4), (G23+T4+G4D)/T1, AAG/T1, (ER+G4D)/(T2+G23), (ER+G12+G23+G4D)/(T1+T3), SL/EFL, SL/ALT, (AAG+G4D)/ER, (AAG+G4D)/(T3+G23), (AAG+G4D)/(T3+T4), (G23+T4+G4D)/T3, AAG/G34, (ER+G4D)/(T2+T4), (ER+G12+G23+G4D)/(T1+G34), TTL/AAG and TTL/ALT of all twelve embodiments, and it is clear that the ocular optical system of the present disclosure satisfy the inequality (1) or (1') and/or inequalities (2), (3), (4), (5), (6), (7), (8), (9), (10), (11), (12), (13), (14), (15), (16), (17), (18) and/or (19).

According to above illustration, the longitudinal spherical aberration, astigmatism aberration both in the sagittal direction and tangential direction and distortion aberration in all embodiments may meet user term of a related product in the market. The off-axis light with respect to three different wavelengths (656 nm, 587 nm, 486 nm) is focused around an image point and the offset of the off-axis light relative to the display point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An ocular optical system, for imaging of imaging rays entering eyes of an observer via the ocular optical system from a display screen, a side facing towards the eye being an eye-side, a side facing towards the display screen being a display-side, sequentially from the eye side to the display side along an optical axis, comprising first, second, third and fourth lens elements, each of the first, second, third and fourth lens elements having an eye-side surface facing toward the eye side and a display-side surface facing toward the display side, wherein:
   the display-side surface of the first lens element comprises a convex portion in a vicinity of the optical axis;
   the second lens element has a positive refracting power;
   the third lens element has a refracting power;
   the display-side surface of the fourth lens element comprises a concave portion in a vicinity of the optical axis;
   the ocular optical system comprises no other lenses having refracting power beyond the first, second, third and fourth lens elements; and
   wherein G4D is a distance between the display-side surface of the fourth lens element and the display screen along the optical axis;
   AAG is a sum of all three air gaps from the first lens element to the fourth lens element along the optical axis;
   SL is a distance from a pupil of the observer to the display screen along the optical axis;
   EFL is an effective focal length of the ocular optical system; and
   G4D and AAG satisfy the inequality: G4D/AAG≤7, and SL and EFL satisfy the inequality: SL/EFL≤1.9.

2. The ocular optical system of claim 1, wherein EFL satisfies the inequality:

$3 \leq 250/EFL \leq 15$.

3. The ocular optical system of claim 1, wherein G23 is an air gap between the second lens element and the third lens element along the optical axis, G34 is an air gap between the third lens element and the fourth lens element along the optical axis; and
AAG, G4D, G23 and G34 satisfy the inequality:

$(AAG+G4D)/(G23+G34) \leq 8.2$.

4. The ocular optical system of claim 1, wherein T1 is a central thickness of the first lens element, T4 is a central thickness of the fourth lens element; and
AAG, G4D, T1 and T4 satisfy the inequality:

$(AAG+G4D)/(T1+T4) \leq 5$.

5. The ocular optical system of claim 1, wherein G23 is an air gap between the second lens element and the third lens element along the optical axis, T4 is a central thickness of the fourth lens element, T1 is a central thickness of the first lens element; and
G23, T4, G4D and T1 satisfy the inequality:

$(G23+T4+G4D)/T1 \leq 10$.

6. The ocular optical system of claim 1, wherein T1 is a central thickness of the first lens element; and
AAG and T1 satisfy the inequality:

$AAG/T1 \leq 3.5$.

7. The ocular optical system of claim 1, wherein ER is a distance from a pupil of the observer to the eye-side surface of the first lens element,
T2 is a central thickness of the second lens element, G23 is an air gap between the second lens element and the third lens element along the optical axis; and
ER, G4D, T2 and G23 satisfy the inequality:

$(ER+G4D)/(T2+G23) \leq 6$.

8. The ocular optical system of claim 1, wherein ER is a distance from a pupil of the observer to the eye-side surface of the first lens element, G12 is an air gap between the first lens element and the second lens element along the optical axis, G23 is an air gap between the second lens element and the third lens element along the optical axis, T1 is a central thickness of the first lens element, T3 is a central thickness of the third lens element; and
ER, G12, G23, G4D, T1 and T3 satisfy the inequality:

$(ER+G12+G23+G4D)/(T1+T3) \leq 16$.

9. The ocular optical system of claim 1, wherein ALT is a sum of the central thicknesses of all four lens elements; and
SL and ALT satisfy the inequality:

$SL/ALT \leq 4.3$.

10. An ocular optical system, for imaging of imaging rays entering eyes of an observer via the ocular optical system from a display screen, a side facing towards the eye being an eye-side, a side facing towards the display screen being a display-side, sequentially from the eye side to the display side along an optical axis, comprising first, second, third and fourth lens elements, each of the first, second, third and fourth lens elements having an eye-side surface facing toward the eye side and a display-side surface facing toward the display side, wherein:

the display-side surface of the first lens element comprises a convex portion in a vicinity of the optical axis;
the second lens element has a positive refracting power;
the third lens element has a refracting power;
at least one of the eye-side surface and the display-side surface of the fourth lens element is aspherical surface;
the ocular optical system comprises no other lenses having refracting power beyond the first, second, third and fourth lens elements; and
G4D is a distance between the display-side surface of the fourth lens element and the display screen along the optical axis,
AAG is a sum of all three air gaps from the first lens element to the fourth lens element along the optical axis;
SL is a distance from a pupil of the observer to the display screen along the optical axis;
EFL is an effective focal length of the ocular optical system; and
G4D and AAG satisfy the inequality: $G4D/AAG \leq 4$, and SL and EFL satisfy the inequality: $SL/EFL \leq 1.9$.

11. The ocular optical system of claim 10, wherein ER is a distance from a pupil of the observer to the eye-side surface of the first lens element; and
AAG, G4D and ER satisfy the inequality:

$(AAG+G4D)/ER \leq 2.5$.

12. The ocular optical system of claim 10, wherein T3 is a central thickness of the third lens element, G23 is an air gap between the second lens element and the third lens element along the optical axis; and
AAG, G4D, T3 and G23 satisfy the inequality:

$(AAG+G4D)/(T3+G23) \leq 6.5$.

13. The ocular optical system of claim 10, wherein T3 is a central thickness of the third lens element, T4 is a central thickness of the fourth lens element; and
AAG, G4D, T3 and T4 satisfy the inequality:

$(AAG+G4D)/(T3+T4) \leq 5$.

14. The ocular optical system of claim 10, wherein G23 is an air gap between the second lens element and the third lens element along the optical axis, T3 is a central thickness of the third lens element; T4 is a central thickness of the fourth lens element; and
G23, T4, G4D and T3 satisfy the inequality:

$(G23+T4+G4D)/T3 \leq 10$.

15. The ocular optical system of claim 10, wherein G23 is an air gap between the third lens element and the fourth lens element along the optical; and
AAG and G34 satisfy the inequality:

$AAG/G34 \leq 6$.

16. The ocular optical system of claim 10, wherein ER is a distance from a pupil of the observer to the eye-side surface of the first lens element, T2 is a central thickness of the second lens element, T4 is a central thickness of the fourth lens element; and
ER, G4D, T2 and T4 satisfy the inequality:

$(ER+G4D)/(T2+T4) \leq 4$.

17. The ocular optical system of claim 10, wherein ER is a distance from a pupil of the observer to the eye-side surface of the first lens element, G12 is an air gap between the first lens element and the second lens element along the optical axis, G23 is an air gap between the second lens element and the third lens element along the optical axis, T1 is a central thickness of the first lens element, G34 is an air gap between the third lens element and the fourth lens element along the optical axis; and ER, G12, G23, G4D, T1 and G34 satisfy the inequality:

$$(ER+G12+G23+G4D)/(T1+G34) \leq 20.$$

18. The ocular optical system of claim 10, wherein TTL is a distance between the eye-side surface of the first lens element and the display screen along the optical axis; and TTL and AAG satisfy the inequality:

$$TTL/AAG \leq 7.$$

19. The ocular optical system of claim 10, wherein TTL is a distance between the eye-side surface of the first lens element and the display screen along the optical axis, ALT is a sum of the central thicknesses of all four lens elements; and TTL and ALT satisfy the inequality:

$$TTL/ALT \leq 2.9.$$

* * * * *